(12) United States Patent
Hirose et al.

(10) Patent No.: US 10,566,607 B2
(45) Date of Patent: Feb. 18, 2020

(54) NEGATIVE ELECTRODE ACTIVE MATERIAL, RAW MATERIAL FOR A NEGATIVE ELECTRODE ACTIVE MATERIAL, NEGATIVE ELECTRODE, LITHIUM ION SECONDARY BATTERY, METHOD FOR PRODUCING A NEGATIVE ELECTRODE ACTIVE MATERIAL, AND METHOD FOR PRODUCING A LITHIUM ION SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Hiroki Yoshikawa, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 46 days.

(21) Appl. No.: 15/897,765

(22) Filed: Feb. 15, 2018

(65) Prior Publication Data
US 2018/0175369 A1   Jun. 21, 2018

Related U.S. Application Data

(63) Continuation of application No. 14/910,201, filed as application No. PCT/JP2014/002878 on May 30, 2014, now Pat. No. 9,935,309.

(30) Foreign Application Priority Data

Aug. 21, 2013   (JP) .................................. 2013-171073
Oct. 18, 2013   (JP) .................................. 2013-217166
Jan. 16, 2014   (JP) .................................. 2014-6182

(51) Int. Cl.
*H01M 4/131* (2010.01)
*C01B 33/113* (2006.01)
(Continued)

(52) U.S. Cl.
CPC .......... *H01M 4/131* (2013.01); *C01B 33/113* (2013.01); *H01M 4/1391* (2013.01); *H01M 4/48* (2013.01);
(Continued)

(58) Field of Classification Search
CPC ....................................................... H01M 4/131
See application file for complete search history.

(56) References Cited

U.S. PATENT DOCUMENTS 5,395,711 A     3/1995  Tahara et al.
2001/0018037 A1  8/2001  Fukuoka et al.
(Continued)

FOREIGN PATENT DOCUMENTS

CN   1492533 A   4/2004
CN   1913200 A   2/2007
(Continued)

OTHER PUBLICATIONS

Yamada et al. (Journal of the Electrochemical Society, 159 (10) A1630-A1635 (2012)).*
(Continued)

*Primary Examiner* — Olatunji A Godo
(74) *Attorney, Agent, or Firm* — Oliff PLC

(57) ABSTRACT

A negative electrode active material including: a particle of negative electrode active material containing silicon-based material of $SiO_x$ ($0.5 \leq x \leq 1.6$); wherein the intensity A of a peak in a Si-region given in the chemical shift region of from −50 to −95 ppm and the intensity B of a peak in a $SiO_2$-region given in the chemical shift region of from −96 to −150 ppm in a $^{29}Si$-MAS-NMR spectrum of the silicon-based material satisfy a relationship that $A/B \geq 0.8$. This provides a negative electrode active material which can increase a battery capacity, and can improve cycle characteristics and initial charge/discharge characteristics when (Continued)

used as a negative electrode active material for a lithium ion secondary battery.

20 Claims, 5 Drawing Sheets

(51) Int. Cl.
H01M 4/485 (2010.01)
H01M 4/1391 (2010.01)
H01M 4/48 (2010.01)
H01M 10/0525 (2010.01)
H01M 10/058 (2010.01)
H01M 4/02 (2006.01)
H01M 4/36 (2006.01)
H01M 4/04 (2006.01)
H01M 4/62 (2006.01)

(52) U.S. Cl.
CPC ......... H01M 4/485 (2013.01); H01M 10/058 (2013.01); H01M 10/0525 (2013.01); H01M 4/0404 (2013.01); H01M 4/366 (2013.01); H01M 4/625 (2013.01); H01M 2004/027 (2013.01); H01M 2220/30 (2013.01)

(56) References Cited

U.S. PATENT DOCUMENTS

| | | |
|---|---|---|
| 2004/0115535 A1 | 6/2004 | Morita et al. |
| 2006/0083987 A1 | 4/2006 | Konishiike et al. |
| 2006/0099507 A1 | 5/2006 | Kogetsu et al. |
| 2008/0176137 A1 | 7/2008 | Endo et al. |
| 2009/0075173 A1 | 3/2009 | Jeong et al. |
| 2009/0202911 A1 | 8/2009 | Fukuoka et al. |
| 2009/0239151 A1 | 9/2009 | Nakanishi et al. |
| 2010/0104951 A1 | 4/2010 | Iwama et al. |
| 2011/0143195 A1 | 6/2011 | Ito et al. |
| 2011/0311875 A1 | 12/2011 | Lee et al. |
| 2012/0288742 A1 | 11/2012 | Tanaka et al. |
| 2013/0052508 A1 | 2/2013 | Kim et al. |

FOREIGN PATENT DOCUMENTS

| | | |
|---|---|---|
| CN | 101567438 A | 10/2009 |
| CN | 101728537 A | 6/2010 |
| CN | 102144320 A | 8/2011 |
| CN | 102792493 A | 11/2012 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-059213 A | 3/2007 |
| JP | 2007-165293 A | 6/2007 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2009-259723 A | 11/2009 |
| JP | 2010-103006 A | 5/2010 |
| JP | 2011090869 A | 5/2011 |
| JP | 2011-113862 A | 6/2011 |
| JP | 2012-509564 A | 4/2012 |
| JP | 2013-055051 A | 3/2013 |
| JP | 2013-101770 A | 5/2013 |
| JP | 2014-220216 A | 11/2014 |
| WO | 2011/001620 A1 | 1/2011 |
| WO | 2012/132387 A1 | 10/2012 |

OTHER PUBLICATIONS

Jul. 8, 2014 Search Report issued in International Patent Application No. PCT/JP2014/002878.
Feb. 23, 2016 International Preliminary Report on Patentability issued in International Patent Application No. PCT/JP2014/002878.
Apr. 7, 2017 Office Action Issued in U.S. Appl. No. 14/910,201.
Apr. 28, 2017 Office Action issued in Chinese Application No. 2014800464004.
May 2, 2017 Office Action issued in Japanese Patent Application No. 2014-162164.
Jul. 31, 2017 Office Action Issued in U.S. Appl. No. 14/910,201.
Nov. 14, 2017 Office Action issued in Japanese Patent Application No. 2014-162164.
Dec. 15, 2017 Office Action issued in Chinese Patent Application No. 201480046400.4.
Chang et al. (Materials and Design 22(2001) 617-623).
U.S. Appl. No. 14/910,201, filed Feb. 14, 2016 in the name of Hirose et al.
May 22, 2018 Office Action issued in Japanese Patent Application No. 2017-127896.
Kim, Taeahn et al. "Solid-State NMR and Electrochemical Dilatometry Study on Li+ Uptake/Extraction Mechanism in SiO Electrode". Journal of the Electrochemical Society, vol. 154, Issue 12, pp. A1112-A1117, 2007.

* cited by examiner

| SEM picture | TEM − EDX element mapping pictures | | |
|---|---|---|---|
|  |  |  |  |
| | Si (silicon) | O (oxygen) | F (fluorine) |

NEGATIVE ELECTRODE ACTIVE MATERIAL, RAW MATERIAL FOR A NEGATIVE ELECTRODE ACTIVE MATERIAL, NEGATIVE ELECTRODE, LITHIUM ION SECONDARY BATTERY, METHOD FOR PRODUCING A NEGATIVE ELECTRODE ACTIVE MATERIAL, AND METHOD FOR PRODUCING A LITHIUM ION SECONDARY BATTERY

This is a Continuation of application Ser. No. 14/910,201 filed Feb. 4, 2016, which in turn is a PCT Application of Application No. PCT/JP2014/002878, filed on May 30, 2014, which claims priority to (1) JP2013-171073, filed on Aug. 21, 2013, (2) JP2013-217166 filed on Oct. 18, 2013, and (3) JP2014-6182 filed on Jan. 16, 2014. The disclosures of the prior applications are hereby incorporated by reference herein in their entirety.

BACKGROUND OF THE INVENTION

1. Field of the Invention

The present invention relates to a negative electrode active material that can absorb and emit a lithium ion, a raw material for a negative electrode active material containing this negative electrode active material, a negative electrode having a negative electrode active material layer formed by this raw material for a negative electrode active material, and a lithium ion secondary battery using this negative electrode.

2. Description of the Related Art

With the widespread diffusion of small-sized electronic devices such as a mobile terminal in recent years, further miniaturization, weight saving, and life-elongation of devices are highly required. For these market demands, development of secondary battery is proceeding, in particular a small-sized, light weight one which can achieve a high energy density.

This secondary battery is also evaluated to apply to large-sized electronic devices such as an automobile, electricity storage systems such as a house, not only to small-sized electronic devices.

Among them, a lithium ion secondary battery is greatly expected, since it is easy to achieve small-size and high capacity in the lithium ion secondary battery, and higher energy density can be obtained in the lithium ion secondary battery compared to a lead battery or a nickel-cadmium battery.

A lithium ion secondary battery described above is provided with a positive electrode and a negative electrode, a separator and an electrolytic solution. The negative electrode contains a negative electrode active material which participates in charge/discharge reaction.

As this negative electrode active material, carbon materials are widely used, whereas further improvement of a battery capacity is required due to the recent market demand.

It has been evaluated to use silicon as a negative electrode active material in order to improve a battery capacity. Since the theoretical capacity of silicon (4199 mAh/g) is larger than the theoretical capacity of graphite (372 mAh/g) by more than ten times, and therefore large improvement of a battery capacity can be expected.

The development of a silicon material as a raw material for a negative electrode active material is not limited to silicon simple substance, but alloys and compounds such as oxides are evaluated.

Further, as the shapes of a negative electrode active material, application type which is standard in carbon materials or built-in type which is directly deposited on a current collector are evaluated.

However, when silicon is used as a main raw material for a negative electrode active material, the negative electrode active material expands/contracts during charge/discharge, and therefore breakage is liable to occur mainly in the vicinity of the negative electrode active material surface. Further, as an ionic material is formed in an active material, the negative electrode active material is liable to break.

When a surface layer of a negative electrode active material break, a new surface is formed thereby, and the reaction area of an active material increases. At this time, the decomposition reaction of an electrolytic solution occurs at the new surface and the new surface is covered with a coat of a decomposition material of the electrolytic solution, and therefore the electrolytic solution is consumed. Accordingly the cycle characteristics is liable to deteriorate.

It has been evaluated various investigations heretofore regarding a negative electrode material for a lithium ion secondary battery mainly consists of silicon material or arrangement of electrodes in order to improve initial battery efficiency or cycle characteristics.

Concretely, silicon and amorphous silicon dioxide are simultaneously deposited by vapor-phase method in order to obtain excellent cycle characteristics or high safety (see patent literature 1, for example). Moreover, a particle of silicon oxide is provided with a carbon material (an electron conductive material) on its surface layer in order to obtain high battery capacity or high safety (see patent literature 2, for example).

Further, an active material containing silicon and oxygen is prepared, and an active material layer in which the oxygen ratio is high in the vicinity of the current collector in order to improve cycle characteristics and obtain high input/output characteristics (see patent literature 3, for example).

Moreover, oxygen is contained in a silicon active material, in which the mean oxygen content is 40 at % or less and is formed so as to increase the oxygen content in the vicinity of the current collector in order to improve cycle characteristics (see patent literature 4, for example).

Further, nano composite containing a Si phase, SiO2, MyO metal oxide is used in order to improve initial charge/discharge efficiency (see patent literature 5, for example).

Moreover, $SiO_x$ ($0.8 \leq x \leq 1.5$, a particle size range=1 μm to 50 μm) and a carbon material are mixed and fired at high temperature in order to improve cycle characteristics (see patent literature 6, for example).

Further, a molar ratio of oxygen to silicon in a negative electrode active material is set to 0.1 to 1.2 and an active material is controlled in a range of the difference between the maximum and the minimum of the molar ratio in the vicinity of the interface of the active material and a current collector is 0.4 or less in order to improve cycle characteristics (see patent literature 7, for example).

Moreover, metal oxide containing lithium is used in order to improve battery loading characteristics (see patent literature 8, for example).

Further, a hydrophobic layer such as silane compound is formed on a silicon material surface layer in order to improve cycle characteristics (see patent literature 9, for example).

Moreover, conductivity is given by using silicon oxide and forming a graphite coat thereon in order to improve cycle characteristics (see patent literature 10, for example). In patent literature 10, broad peaks appeared at 1330 cm-1 and 1580 cm-1 in a shift value of RAMAN spectrum regarding graphite coat, and their intensity ratio I1330/I1580 is in the range of 1.5<I1330/I1580<3.

Further, a particle containing a silicon microcrystalline phase dispersed in silicon oxide is used in order to obtain a high battery capacity and improve cycle characteristics (see patent literature 11, for example).

Moreover, silicon oxide in which a molar ratio of silicon atom and oxygen atom is controlled to 1:y (0<y<2) is used in order to improve overcharge/overdischarge characteristics (see patent literature 12, for example).

CITATION LIST

Patent Literature

Patent Literature 1: Japanese Unexamined Patent Application Publication (kokai) No. 2001-185127
Patent Literature 2: Japanese Unexamined Patent Application Publication (kokai) No. 2002-042806
Patent Literature 3: Japanese Unexamined Patent Application Publication (kokai) No. 2006-164954
Patent Literature 4: Japanese Unexamined Patent Application Publication (kokai) No. 2006-114454
Patent Literature 5: Japanese Unexamined Patent Application Publication (kokai) No. 2009-070825
Patent Literature 6: Japanese Unexamined Patent Application Publication (kokai) No. 2008-282819
Patent Literature 7: Japanese Unexamined Patent Application Publication (kokai) No. 2008-251369
Patent Literature 8: Japanese Unexamined Patent Application Publication (kokai) No. 2008-177346
Patent Literature 9: Japanese Unexamined Patent Application Publication (kokai) No. 2007-234255
Patent Literature 10: Japanese Unexamined Patent Application Publication (kokai) No. 2009-212074
Patent Literature 11: Japanese Unexamined Patent Application Publication (kokai) No. 2009-205950
Patent Literature 12: Japanese Patent No. 2997741

SUMMARY OF THE INVENTION

As described above, small-sized mobile devices represented by electronic devices have been advancing recently toward high performance and multifunction, and a lithium ion secondary battery that is main electric source thereof is required to improve a battery capacity.

As a technique to solve this problem, it is desired to develop a lithium ion secondary battery containing a negative electrode using a silicon material as a main material.

Further, for a lithium ion secondary battery using a silicon material, it is desired to show a cycle characteristics almost equivalent to that of a lithium ion secondary battery using a carbon material.

However, it is not reached the stage to propose a negative electrode active material which shows a cycle stability equivalent to that of a lithium ion secondary battery using a carbon material.

The present invention was performed in view of the above problems, and it is an object of the present invention to provide a negative electrode active material in which a battery capacity can be improved, and cycle characteristics and initial charge/discharge characteristics can be improved when used as a negative electrode active material for a lithium ion secondary battery; a raw material for a negative electrode active material containing this negative electrode active material; a negative electrode having a negative electrode active material layer formed by this raw material for a negative electrode active material; and a lithium ion secondary battery using this negative electrode.

In order to achieve the object, according to the present invention, there is provided a negative electrode active material comprising: a particle of negative electrode active material containing silicon-based material consisting of $SiO_x$ (0.5≤x≤1.6); wherein the intensity A of a peak in a Si-region given in the chemical shift region of from −50 to −95 ppm and the intensity B of a peak in a $SiO_2$-region given in the chemical shift region of from −96 to −150 ppm in a $^{29}Si$-MAS-NMR spectrum of the silicon-based material satisfy a relationship that A/B≥0.8.

According to such silicon-based material having the composition ratio and the peak-intensity ratio described above, a high battery capacity as well as excellent cycle characteristics and initial charge/discharge characteristics can be obtained when a negative electrode active material which contain a particle of negative electrode active material containing this silicon-based material is used as a negative electrode active material for a lithium ion secondary battery.

It is preferable that the particle of negative electrode active material has a peak given in the chemical shift region of from −70 to −85 ppm given in a $^{29}Si$-MAS-NMR spectrum.

According to such a particle of negative electrode active material having a Si-region peak in that region, better cycle characteristics can be obtained.

It is preferable that the particle of negative electrode active material has at least two peaks given in the chemical shift region of from −50 to −95 ppm in a $^{29}Si$-MAS-NMR spectrum.

According to such a particle of negative electrode active material having two or more peaks in the Si-region, better initial charge/discharge characteristics can be obtained.

It is preferable that the particle of negative electrode active material has at least one peak corresponding to any one or more of $Li_2SiO_3$ and $Li_4SiO_4$ in a region given in the chemical shift region of from −50 to −95 ppm in a $^{29}Si$-MAS-NMR spectrum.

Such lithium silicates can be preferably contained in the particle of negative electrode active material.

It is preferable that the particle of negative electrode active material to have a peak corresponding to metal Si in a region given in the chemical shift region of from −50 to −95 ppm in a $^{29}Si$-MAS-NMR spectrum.

Such Si in a metal state can be preferably contained in the particle of negative electrode active material.

The particle of negative electrode active material preferably contains any one or more of $Li_2SiO_3$, $Li_4SiO_4$, $Li_2O$, and $Li_2CO_3$.

The particle of negative electrode active material having such a constitution can be preferably used.

The particle of negative electrode active material preferably contains any two or more of $Li_2SiO_3$, $Li_4SiO_4$, $Li_2O$, and $Li_2CO_3$.

The particle of negative electrode active material having such a constitution can be preferably used.

It is preferable that the full width at half maximum (2θ) of a diffraction peak due to $Li_2SiO_3$ at near 38.2680° in an X-ray diffraction, is 0.75° or more.

According to the particle of negative electrode active material which contain the $Li_2SiO_3$ having such crystallinity, better cycle characteristics and initial charge/discharge characteristics can be obtained.

It is preferable that the full width at half maximum (2θ) of a diffraction peak due to $Li_4SiO_4$ at near 23.9661° in an X-ray diffraction, is 0.2° or more.

According to the particle of negative electrode active material which contain the $Li_4SiO_4$ having such crystallinity, better cycle characteristics and initial charge/discharge characteristics can be obtained.

The $Li_2SiO_3$ and the $Li_4SiO_4$ are preferably amorphous.

According to the particle of negative electrode active material containing such amorphous Li compound, better cycle characteristics and initial charge/discharge characteristics can be obtained.

It is preferable that the particle of negative electrode active material contains a fluorine compound in the form of an island, a film, or an unevenness on at least a part of its surface.

According to such a particle of negative electrode active material containing a fluorine compound on its surface, better initial charge/discharge characteristics can be obtained and the long-term storage stability of the raw material for an active material can be improved.

The fluorine compound is preferably lithium fluoride or a decomposition product of $LiPF_6$.

Such a compound can be preferably used as a fluorine compound on a surface of the particle of negative electrode active material.

It is preferable that in the negative electrode active material, the full width at half maximum (2θ) of a diffraction peak attributable to (111) crystal face in an X-ray diffraction, is 1.2° or more, and the size of the crystallite corresponding to the crystal face is 7.5 nm or less.

According to the negative electrode active material having the above crystallinity, better cycle characteristics and initial charge/discharge characteristics can be obtained when such a negative electrode active material is used as a negative electrode active material for a lithium secondary battery.

It is preferable that the particle of negative electrode active material has a median diameter of 0.5 μm or more and 20 μm or less.

According to the particle of negative electrode active material having the median diameter in the above range, better cycle characteristics and initial charge/discharge characteristics can be obtained when the negative electrode active material containing such a particle of negative electrode active material is used as a negative electrode active material for a lithium secondary battery.

It is preferable for the particle of negative electrode active material to have a carbon material on its surface.

According to the particle of negative electrode active material having a carbon material on its surface, the conductivity can be improved, thereby battery characteristics can be improved when the negative electrode active material containing such a particle of negative electrode active material is used as a negative electrode active material for a lithium secondary battery.

The average thickness of the coating carbon material is preferably 1 nm or more and 5000 nm or less.

The average thickness of the coating carbon material of 1 nm or more can improve the conductivity, and the average thickness of the coating carbon material of 5000 nm or less can suppress the lowering of a battery capacity when the negative electrode active material containing such a particle of negative electrode active material is used as a negative electrode active material for a lithium secondary battery.

It is preferable that the particle of negative electrode active material has $SiO_x$, carbon, and a fluorine compound or has $SiO_x$ and a fluorine compound at least partially.

The particle of negative electrode active material having such a constitution can be preferably used.

It is preferable that the mean coverage of the coating layer consisting of the fluorine compound is 30% or more.

According to the above mean coverage, better cycle characteristics and initial charge/discharge characteristics can be obtained when the negative electrode active material containing such a particle of negative electrode active material is used as a negative electrode active material for a lithium secondary battery.

It is preferable that the mean coverage of the coating layer consisting of the carbon material is 30% or more.

According to the above mean coverage, better battery loading characteristics can be obtained when the negative electrode active material containing such a particle of negative electrode active material is used as a negative electrode active material for a lithium secondary battery.

A raw material for a negative electrode active material preferably contains the above negative electrode active material and a carbon material.

When a raw material forming a negative electrode active material layer contains a carbon material together with the negative electrode active material of the present invention, the conductivity of a negative electrode active material layer can be improved.

The present invention also provides a negative electrode comprising a negative electrode active material layer formed by the raw material for a negative electrode active material of the present invention, and a negative electrode current collector, wherein the negative electrode active material layer is formed on the negative electrode current collector, and the negative electrode current collector contains carbon and sulfur, and each content is 100 ppm or less.

When the negative electrode current collector constituting a negative electrode contains carbon and sulfur in such contents, deformation of the negative electrode during charge can be suppressed.

The present invention further provides a lithium ion secondary battery, wherein the lithium ion secondary battery uses a negative electrode containing any one of the above negative electrode active materials as a negative electrode.

According to the lithium ion secondary battery having a negative electrode containing such a negative electrode active material, a high capacity as well as better cycle characteristics and initial charge/discharge characteristics can be obtained.

The present invention also provides a method for producing a negative electrode active material containing a particle of negative electrode active material which contains silicon-based material consisting of $SiO_x$, comprising selecting and then using a silicon-based material wherein the x is 0.5 or more and 1.6 or less and the intensity A of a peak in a Si-region given in the chemical shift region of from −50 to −95 ppm and the intensity B of a peak in a $SiO_2$-region given in the chemical shift region of from −96 to −150 ppm in a $^{29}Si$-MAS-NMR spectrum satisfy a relationship that $A/B \geq 0.8$.

According to the production of a negative electrode active material by selecting a silicon-based material in such a way, it is possible to produce a negative electrode active material with a high capacity as well as excellent cycle characteristics and initial charge/discharge characteristics when used as a negative electrode active material for a lithium ion secondary battery.

The present invention also provides a method for producing a lithium ion secondary battery, comprising preparing a negative electrode by using a negative electrode active material made by the method for producing a negative electrode active material described above, and producing a lithium ion secondary battery by using the prepared negative electrode.

This producing method makes it possible to produce a lithium ion secondary battery with a high capacity as well as excellent cycle characteristics and initial charge/discharge characteristics by using a negative electrode active material containing a particle of negative electrode active material which contains silicon-based material selected as described above.

As described above, according to the negative electrode active material of the present invention, a high capacity as well as excellent cycle characteristics and initial charge/discharge characteristics can be obtained when used as a negative electrode active material for a lithium ion secondary battery. Moreover, according to the method for producing a negative electrode active material of the present invention, it is possible to produce a negative electrode active material for a lithium ion secondary battery with excellent cycle characteristics and initial charge/discharge characteristics.

DETAILED DESCRIPTION OF THE PREFERRED EMBODIMENTS

Hereinafter, the present invention will be detailed as an example of an embodiment with referring figures. However, the present invention is not limited thereto.

As described above, it has been investigated to use a negative electrode mainly consists of silicon material as a negative electrode for a lithium ion secondary battery in order to increase a battery capacity of a lithium ion secondary battery.

Although it has been desired that this lithium ion secondary battery using silicon material shows cycle characteristics close to be equivalent to a lithium ion secondary battery using carbon material, it has not yet proposed a negative electrode active material which shows a cycle stability equal to a lithium ion secondary battery using carbon material.

Therefore, the present inventors have investigated negative electrode active materials in which excellent cycle characteristics can be obtained when uses as a negative electrode of a lithium ion secondary battery.

As a result thereof, the present inventors have found that excellent cycle characteristics and initial charge/discharge characteristics are obtained by using silicon-based material consisting of SiOx ($0.5 \leq x \leq 1.6$), in which the intensity A of a peak in a Si-region given in the chemical shift region of from $-50$ to $-95$ ppm and the intensity B of a peak in a SiO$_2$-region given in the chemical shift region of from $-96$ to $-150$ ppm in a $^{29}$Si-MAS-NMR spectrum of the silicon-based material satisfy a relationship that A/B≥0.8 when a negative electrode active material containing a particle of negative electrode active material which contains the silicon-based material is used as a negative electrode active material of a lithium ion secondary battery.

<Negative Electrode for a Lithium Ion Secondary Battery>

First, a negative electrode for a lithium ion secondary battery will be explained.

Figure 1:
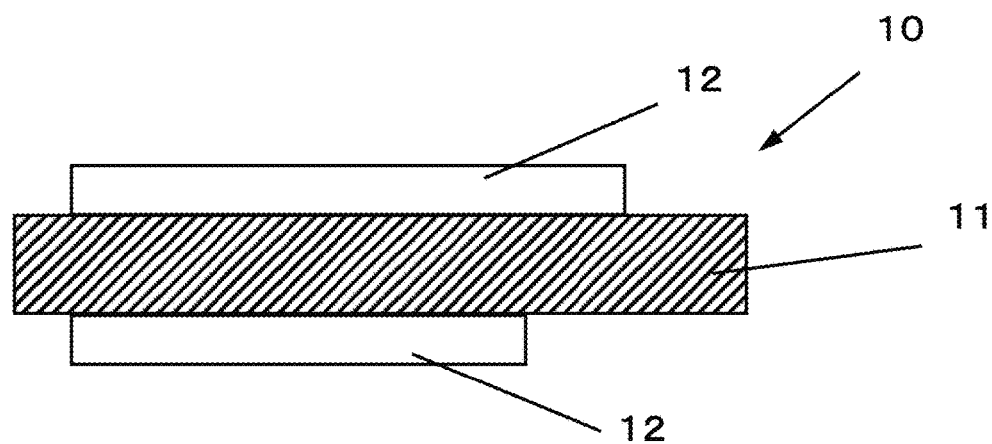
FIG. 1 is a schematic cross-sectional view of the constitution of the negative electrode for a lithium ion secondary battery of the present invention.
Figure 2:
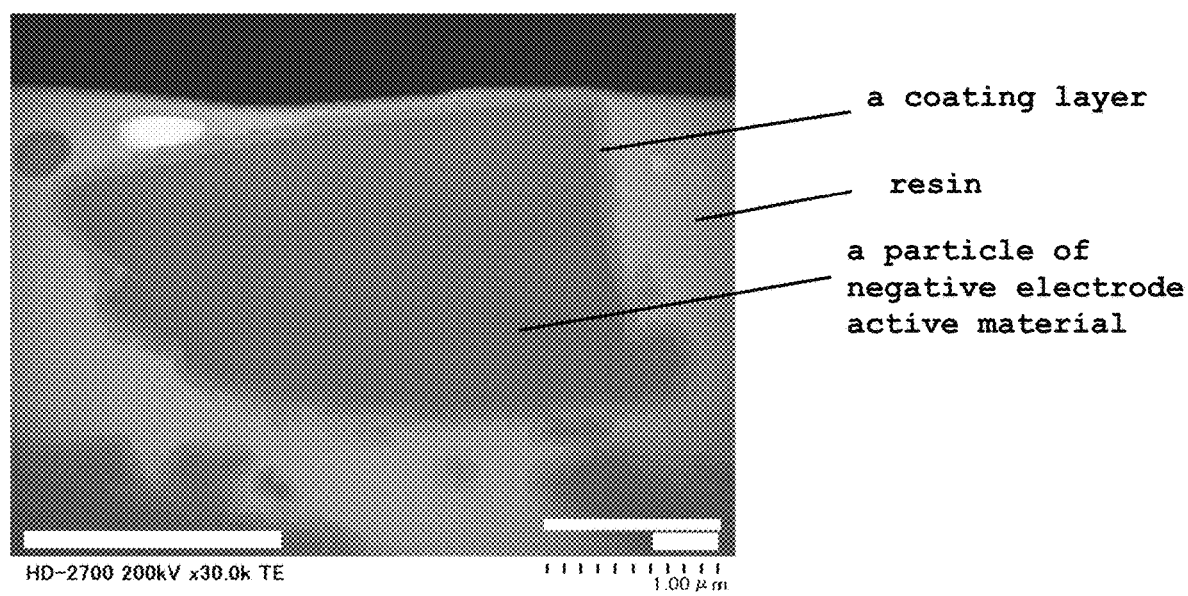
FIG. 2 is a TEM photograph showing the cross-sectional structure of the particle of negative electrode active material.

FIG. 1 shows a cross-sectional constitution of the negative electrode for a lithium ion secondary in an embodiment of the present invention (hereinafter, described as "negative electrode"), and FIG. 2 is a TEM (Transmission Electron Microscope) photograph showing the cross-sectional structure of the particle of negative electrode active material.

[Constitution of the Negative Electrode]

As shown in FIG. 1, a negative electrode 10 is constituted so as to have a negative electrode active material layer 12 on a negative electrode current collector 11. In addition, the negative electrode active material layer 12 may be provided either on both sides or on only one side of the negative electrode current collector 11. Further, the negative electrode current collector 11 may be eliminated if the negative electrode active material of the present invention is used.

[Negative Electrode Current Collector]

The negative electrode current collector 11 is constituted of material with excellent conductivity and a large mechanical strength. As conductive material, copper (Cu) or nickel (Ni) are illustrated, for example.

Incidentally, this conductive material is preferably a material which does not form an intermetallic compound with lithium (Li).

It is preferred that the negative electrode current collector 11 contains carbon (C) or sulfur (S) other than the main elements. Because it improves a physical strength of the negative electrode current collector 11.

Especially, when the negative electrode has an active material layer which expands during charge there arises an effect to suppress a deformation of the electrode including the current collector if the current collector contains the above elements.

Although the contents of the above contained-elements are not particularly limited, it is preferred to be 100 ppm or less, since higher deformation-suppressing effect can be obtained.

Moreover, the surface of the negative electrode current collector 11 may be roughened or not be roughened. Illustrative examples of the negative electrode current collector which surface is roughened includes metal foil which is treated by electrolysis, embossing, or chemically etching. Illustrative examples of the negative electrode current collector which surface is not roughened includes rolling metal foil.

[Negative Electrode Active Material Layer]

The negative electrode active material layer 11 contains plural of particulate negative electrode active material (hereinafter, referred as "a particle of negative electrode active material") which can absorb/emit lithium ions, and may contain other materials such as a negative electrode binder or a conductive assistant agent from the viewpoint of battery design.

Figure 4:
FIG. 4 is a SEM photograph showing a cross-sectional structure of a particle of negative electrode active material and EDX mapping photographs showing a cross-sectional structure of a particle of negative electrode active material and a generated composition.
Figure 4:
Figure 4:
Figure 4:
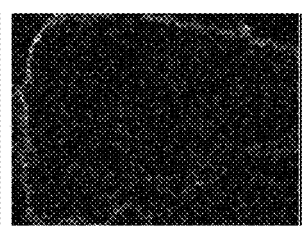

The particle of negative electrode active material is composed of a core part which can absorb/emit lithium ions, a carbon coating part which gives conductivity, and a fluorine compound part which exhibits effect for suppressing decomposition reaction of the electrolyte; and the above constitution is confirmed by TEM-EDX photography shown in FIG. 4. In this case, the absorption/emission of lithium ions may be conducted on at least a part of the carbon coating part. Moreover, the fluorine compound part coats at least apart of the surface of the particles of negative electrode active material. In this case, the coating part exhibits the effect in any form of an island, a film, or an unevenness.

The particle of negative electrode active material is silicon oxide material containing silicon-based material ($SiO_x$: $0.5 \leq x \leq 1.6$), and it is preferred that "x" is near to 1 as the composition of a silicon-based material, since higher cycle characteristics can be obtained.

In addition, the silicon-based material in the present invention is not necessarily meaning 100% of purity, and may contain a slight contents of impurity elements.

The silicon-based material gives stabilized battery property when the intensity A of a peak in a Si-region given in the chemical shift region of from −50 to −95 ppm and the intensity B of a peak in a $SiO_2$-region given in the chemical shift region of from −96 to −150 ppm in a $^{29}$Si-MAS-NMR spectrum of the silicon-based material satisfy a relationship that A/B 0.8.

Here, the intensity of a peak means a height of the peak at each peak value. Moreover, when there are plural of peaks, it is possible to determine the intensity of a peak by the sum of the heights of the plural of peaks.

In addition, in measuring $^{29}$Si-MAS-NMR spectrum, 700NMR spectroscope made by Bruker Corporation was used as an apparatus, 4 mm HR-MAS rotter 50 μL was used as a probe, the sample rotating speed was set to 10 kHz, and measuring ambient temperature was set to 25° C.

In the above range of the ratio of the peak intensities, a part of the $SiO_2$ component generated in the silicon oxide can be selectively modified to a Li compound(s).

Among them, $Li_4SiO_4$, $Li_2SiO_3$, $Li_2O$, and $Li_2CO_3$ exhibit particularly excellent property.

As a method for producing the selective compounds (Li compounds), it is preferred to use an electrochemical method.

It is possible to produce the selective compounds by modifying conditions such as electric potential regulation or electric current regulation to a lithium opposite electrode.

Moreover, the selective compounds can give more dense substances by drying a part of them under carbon dioxide atmosphere or oxygen atmosphere and the like after they were partially produced by electrochemical method.

A Li compound can be quantitate by NMR (Nuclear Magnetic Resonance) or XPS (X-ray photoelectron spectroscopy).

In addition, in the quantification of a Li compound by XPS, a X-ray photoelectron spectroscopy apparatus was used as an apparatus, monochromatic AlKα ray was used as an X-ray source, an X-ray spot diameter was set to 100 μmϕ, and the sputtering condition of Ar ion gun was set to 0.5 kV/(2 mm*2 mm).

Moreover, it is possible to lower or avoid to modify to Li compounds in Si area by using the method described above, and to make the substance stable in the atmosphere, aqueous slurry, or solvent slurry.

Furthermore, it is possible to make more stable substance by the method described above compared to thermal reforming in which random generation of compounds are proceeded.

At least one of $Li_4SiO_4$, $Li_2SiO_3$, $Li_2O$, and $Li_2CO_3$ generated in the bulk improves the property, but coexistence of two or more of the above Li compounds further improve the property.

Further, generation of a fluorine compound on the outmost surface layer of the particle of negative electrode active material dramatically improves the storage property of powder. Especially, it is preferred to exist in a coverage of 30% or more.

As a material of the fluorine compound, but LiF or a decomposition product of $LiPF_6$ are illustrated, LiF is most preferred. In addition, the producing method for the fluorine compound is not particularly limited, but an electrochemical method is most preferred.

The crystallinity of the negative electrode active material is lower, the better. It is desirable that a full width at half maximum (2θ) of a diffraction peak in an X-ray diffraction attributable to Si(111) crystal face is 1.2° or more and the size of the crystallite corresponding to the above crystal face is 7.5 nm or less.

In particular, the existence of Si crystal deteriorates battery property, and further, it comes to difficult to generate a stable Li compound by the existence of Si crystal.

Although a median diameter ($D_{50}$: the particle size at the cumulative volume of 50%) of a particle of negative electrode active material is not particularly limited, 0.5 μm to 20 μm is preferred.

Since when the median diameter is in the above range, lithium ion can be easily absorbed and emitted during charge/discharge, and the particle is hard to brake. The median diameter of 0.5 μm or more can suppress an increase of an irreversible battery capacity due to an increase of the surface area. On the other hand, the median diameter of 20 μm or less can suppress that the particle easily brakes and thereby a new surface is easily generated.

Although an average thickness of a carbon coating part is not particularly limited, 1 nm to 5000 nm is desirable.

The average thickness of 1 nm or more can improve an electric conductivity.

The average thickness of 5000 nm or less can suppress lowering of a battery capacity.

This average thickness of a carbon coating part can be calculated by the following procedure, for example.

First, a negative electrode active material is observed by TEM at an arbitrary magnification as shown in FIG. 2. This magnification is preferably the one by which a thickness of a coating part can be determined in order to measure the thickness.

Following this, the thicknesses of the coating part are measured at arbitrary 15 points. Here it is preferred to set the measuring points so as to select widely and random, not to focus to a particular point.

Finally, an average value of the thicknesses at the above 15 points of the coating part is calculated.

Although a mean coverage of the carbon material is not particularly limited, it is desirable to be higher as possible. When the coverage is 30% or more, a sufficient conductivity can be obtained.

As a coating method of the carbon material, although it is not particularly limited, carbonization of sugar, thermal cracking of hydrocarbon gas are preferred, since they can improve the coverage.

As the negative electrode binder, anyone or more of polymer material, synthetic rubber, and so on are usable, for example.

Illustrative examples of the polymer material includes polyvinylidene fluoride, polyimide, polyamideimide, aramid, polyacrylic acid, lithium polyacrylate, carboxymethylcellulose.

Illustrative examples of the synthetic rubber includes styrene-butadiene rubber, fluororubber, ethylene-propylene-diene.

As the negative electrode conductive assistant agent, any one or more of a carbon material, such as carbon black, acetylene black, graphite, ketjen black, carbon nanotube, carbon nanofiber can be used.

The negative electrode active material layer 12 may be prepared in a mixed state with a carbon material. This can lower electric resistance of the negative electrode active material layer 12 and reduce expansion stress accompanying with charge. Illustrative examples of this carbon material includes thermally decomposed carbons, cokes, glassy carbon fiber, fired organic polymer compound, carbon black, etc.

The negative electrode active material layer 12 is formed by an application method, for example. The application method is a method in which the particle of negative electrode active material is mixed with the above binder and so on, optionally with a conductive assistant anent or a carbon material, and then dispersed to organic solvent, water, or the like so as to be applied.

[Method for Producing a Negative Electrode]

The negative electrode 10 is produced by the following procedure, for example.

First, a raw material which generates silicon oxide gas is heated at a temperature range of 900° C. to 1600° C. in a reduced pressure under an inert gas atmosphere to generate silicon oxide gas. In this case, the raw material is a mixture of metal silicon powder and silicon dioxide powder, and the molar ratio of the mixture is preferably in a range of 0.8<metal silicon powder/silicon dioxide powder <1.3 when considering the existence of oxygen on surface of the metal silicon powder and slight oxygen in a reaction furnace.

Then, the generated gas is solidified and deposited on an absorbing plate.

Next, the deposit is taken out under the condition of the temperature in the reaction furnace of 100° C. or below, and then the deposit is ground and powdered using a ball mil, a jet mil, or the like.

Incidentally, a Si crystallite in a particle is controlled by change of vaporize temperature or thermal treatment after the generation.

Moreover, vapor deposition SiO film may be formed by direct deposition of the generated silicon oxide gas onto a copper foil.

Then, a carbon layer is preferably formed onto a surface layer of the obtained silicon oxide powder material. As a method for forming the carbon material layer, a thermal decomposition CVD method is desirable.

A method for forming the carbon material layer by thermal decomposition CVD method will be explained bellow.

First, silicon oxide powder is set in a furnace.

Then, hydrocarbon gas is introduced into the furnace, and the temperature of the furnace is raised.

Although the decomposition temperature is not particularly limited, 1200° C. or below is desirable and 950° C. or below is more desirable. By setting the decomposition temperature at 1200° C. or below, disproportionation of an active material particle can be suppressed.

After the furnace temperature is raised to a certain temperature, the carbon layer is formed on the silicon oxide powder.

The hydrocarbon gas is not particularly limited, but in a composition of $C_nH_m$, $n \leq 3$ is desirable. When $n \leq 3$, the producing cost can be lowered, and the property of the decomposition product can be improved.

Then the silicon oxide powder is subjected to an inner-bulk reforming.

It is desirable that the inner-bulk reforming is performed by inserting Li electrochemically. In this case, inner-bulk generating substance can be controlled by adjusting electric potential during insertion or electric potential during elimination, or changing electric current density, bath temperature, insertion/elimination times.

Figure 5:
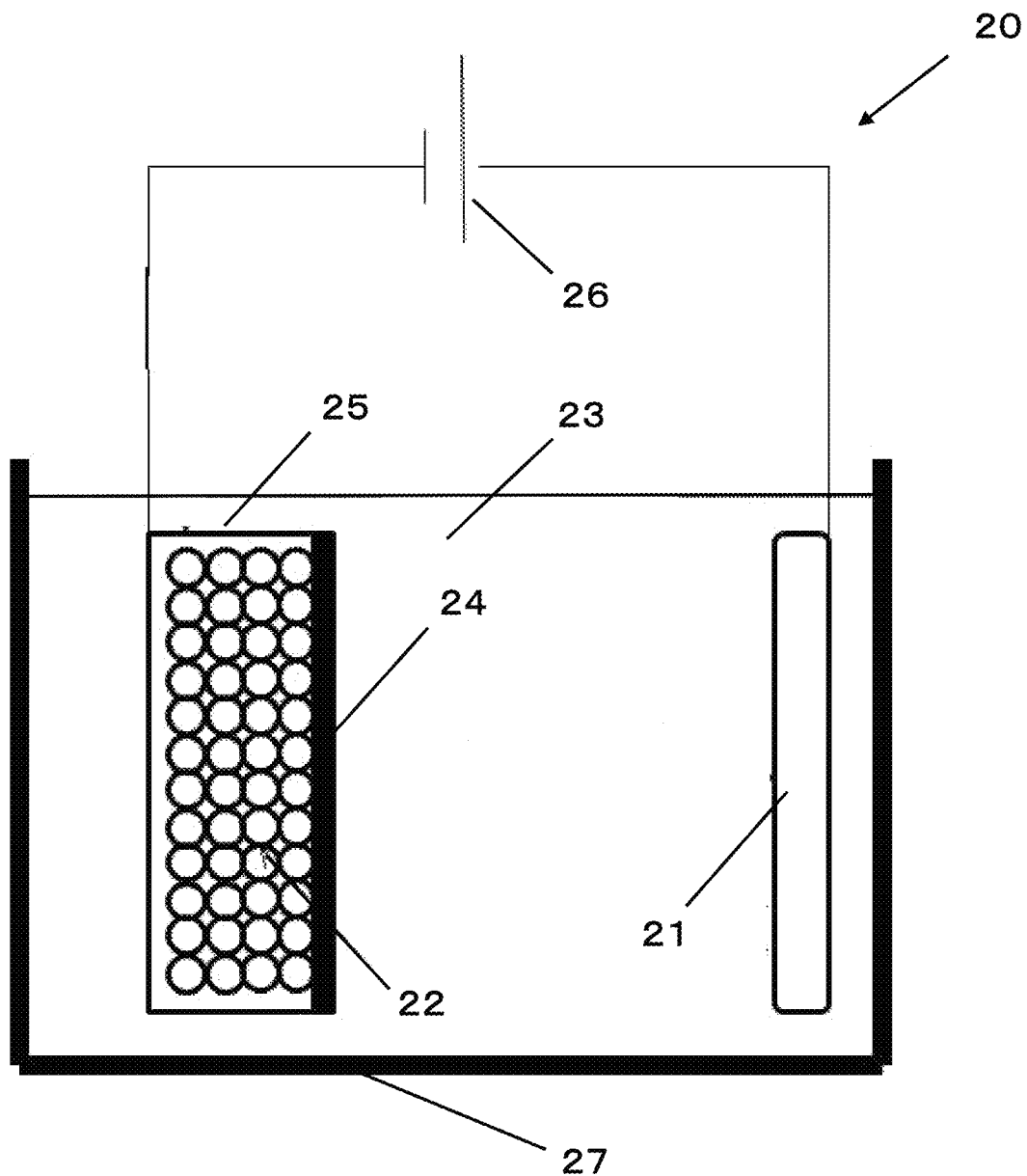
FIG. 5 is an inner-bulk reforming apparatus used for producing the negative electrode active material of the present invention.

The inner-bulk reforming can be performed by using, for example, an inner-bulk reforming apparatus 20 shown in FIG. 5, although the structure of the apparatus is not particularly limited.

The inner-bulk reforming apparatus 20 is provided with a bath 27 filled with organic solvent 23, a positive electrode (lithium source) 21 arranged in the bath 27 and connected to the one side of an electric source 26, a powder storage container 25 arranged in the bath 27 and connected to the other side of an electric source 26, and a separator 24 provided between the positive electrode 21 and the powder storage container 25. Besides, in FIG. 5, the reference number 22 is a silicon oxide powder.

It is desirable that the reformed active material is subsequently dried in an oxygen atmosphere, a carbonic acid atmosphere, a fluorine atmosphere, or a hydrogen atmosphere and the like. Thereby the bulk composition becomes more favorable. Besides, it is desirable to set the temperature, although it is not particularly limited, to 800° C. or below, since disproportionation of the particle can be suppressed.

In the above inner-bulk reforming, it is desirable to form a fluorine compound by changing electric potential or temperature condition. Thereby a denser film can be obtained.

Especially, lithium fluoride it is desirable to be kept at 45° C. or more during Li insertion and Li elimination when forming the lithium fluoride.

Besides, the reformed particle does not necessarily contain a carbon layer. However, when more homogeneous control is required in the above inner-bulk reforming treatment, lowering of an electric potential distribution is necessary, and therefore the existence of a carbon layer is desirable.

As organic solvent 23 in the bath 27, ethylene carbonate, propylene carbonate, dimethyl carbonate, diethyl carbonate, ethyl methyl carbonate, fluoromethyl methyl carbonate, difluoromethyl methyl carbonate, etc. may be used.

Moreover, lithium hexafluorophosphate ($LiPF_6$), lithium tetrafluoroborate ($LiBF_4$), etc. may be used as electrolyte salt contained in the organic solvent 23.

As the positive electrode 21, Li foil may be used, and a Li-containing compound also may be used. Further, it is possible to use lithium carbonate, lithium oxide, lithium chloride, lithium cobalt oxide, olivine iron lithium, etc. as a Li-containing compound.

Subsequently, the particle of negative electrode active material is mixed with other materials such as a negative electrode binder, a conductive assistant agent, etc. to make a negative electrode mixture, and then a slurry is made by adding organic solvent, water, etc.

Then the above negative electrode mixture slurry is applied to the surface of negative electrode current collector 11 and is dried to form the negative electrode active material layer 12. In this case, heating press may be performed according to a necessity.

Besides, in the above description, the inner-bulk reforming is performed on a silicon oxide powder, but it is possible to perform the inner-bulk reforming in a condition that a silicon material is applied on the electrode, and it is also possible to perform the inner-bulk reforming in a condition that a silicon material and a carbon material are mixed and applied on the electrode.

According to the negative electrode described above, the initial battery efficiency and the stability of an active material related to the cycle characteristics are improved by converting $SiO_2$ component in the bulk of a particle of negative electrode active material to stable Li compound.

Especially, it is necessary that the intensity A of a peak in a $^{29}Si$-region and the intensity B of a peak in a $SiO_2$-region in a $^{29}Si$-MAS-NMR spectrum satisfy a relationship that $A/B \geq 0.8$. In this case, higher effect can be obtained when Li silicate and lithium carbonate are formed in the bulk or on its surface layer.

Moreover, it is possible that a state of the compound in the bulk is be more homogenized by coating the particle of negative electrode active material with a carbon material. And by the existence of fluoride on the surface layer of the particle of negative electrode active material, the stability as an active material is improved, thereby higher effect can be obtained.

Further, it is possible to obtain an effect for suppressing a deformation of the electrode containing current collector when the negative electrode current collector 11 contains carbon and sulfur in an amount of 100 ppm or less.

<Lithium Ion Secondary Battery>

Next, a lithium ion secondary battery using the above negative electrode for a lithium ion secondary battery will be explained with referring to FIG. 3.

[Constitution of Laminate Film Type Secondary Battery]

Figure 3:
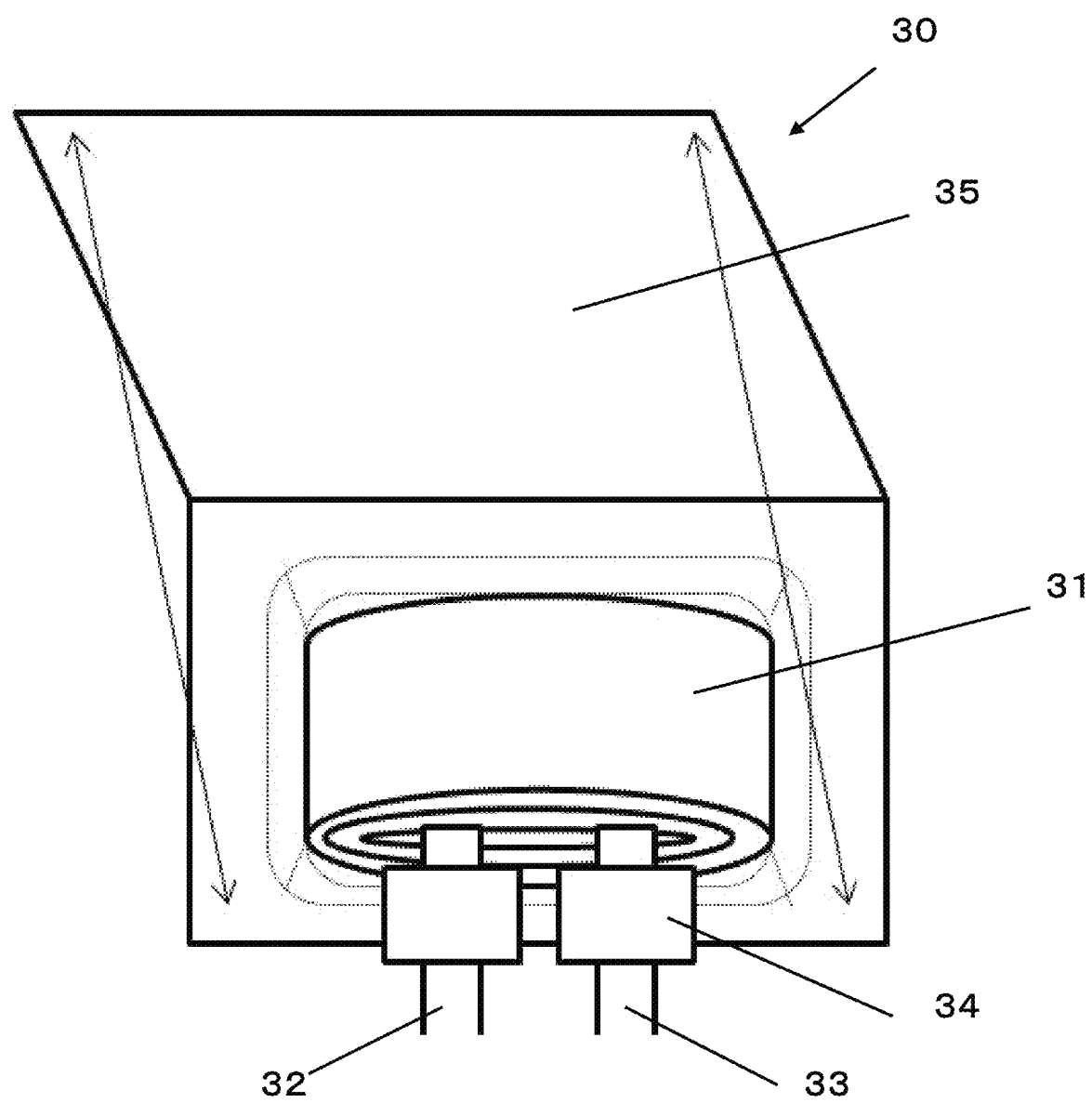
FIG. 3 is a figure showing an example of the constitution of the lithium ion secondary battery (laminate film type) of the present invention.

In a laminate film type secondary battery 30 shown in FIG. 3 mainly stores a wound electrode body 31 in a seat shaped outer packaging 35. This wound body is provided with a separator between a positive electrode and a negative electrode and are wound. In addition, there exists a case which stores a laminate body having a separator between a positive electrode and a negative electrode.

In either electrode body, a positive electrode lead 32 is attached to the positive electrode, and a negative electrode lead 33 is attached to the negative electrode. The periphery of the electrode body is protected by a protection tape.

The positive and negative leads are led out toward one direction from the inside to the outside of the outer packaging 35, for example. The positive electrode lead 32 is formed by conductive material such as aluminum, and the negative electrode lead 33 is formed by conductive material such as nickel, copper.

The outer packaging 35 is, for example, a laminate film in which a fused layer, a metal layer, and a surface protection layer are laminated in this order. These laminate films are adhered each other at the peripheral edges on the fused layers of the two films by fusion, adhesive, etc. such that the fused layers are faced to the electrode body 31.

The fusion layer is a film such as polyethylene or polypropylene, and the metal layer is aluminum foil and so on. The protection layer is nylon, for example.

In order to prevent a permeation of the open air, an adhesion film 34 is inserted between the outer packaging 35 and the positive and negative leads. Illustrative examples of this material includes polyethylene, polypropylene, polyolefin resin.

[Positive Electrode]

The positive electrode is provided with positive electrode active material layers on both sides or on one side of a positive current collector, for example, similarly to a negative electrode 10 in FIG. 1.

The positive current collector is formed by conductive material such as aluminum.

The positive electrode active material layer contains any one or more of positive electrode material which can absorb and emit lithium ions, and may contain other materials such as a binder, a conductive assistant agent, and a dispersing agent according to the design. In this case, the details of a binder and a conductive assistant agent may be the same as, for example, a negative electrode binder and a negative electrode conductive assistant agent already described.

As the positive electrode material, a lithium-containing compound is desirable. Illustrative examples of this lithium-containing compound includes composite oxides consist of lithium and a transition metal element or phosphate compounds containing lithium and a transition metal element. Among these positive electrode materials, compounds containing one or more of nickel, iron, manganese, cobalt are preferred.

These positive electrode materials are represented by chemical formulae such as $Li_xM1O_2$ or $Li_yM2PO_4$. In the above chemical formulae, M1 and M2 represent at least one transition metal element; the values "x" and "y" are generally represented by $0.05 \leq x \leq 1.10$, $0.05 \leq y \leq 1.10$, although they represent different values depending on a charge/discharge state of a battery.

As the composite oxides containing lithium and a transition metal element, for example, composite oxide of lithium and cobalt ($Li_xCoO_2$), composite oxide of lithium and nickel ($Li_xNiO_2$), etc. are illustrated. As the phosphate compounds containing lithium and a transition metal element, for example, lithium iron phosphate compound ($LiFePO_4$), lithium manganese phosphate compound ($LiFe_{1-u}Mn_uPO_4$ ($0 < u < 1$)) are illustrated. By using positive electrode material described above, a high battery capacity together with excellent cycle characteristics can be obtained.

[Negative Electrode]

The negative electrode has a constitution similar to the negative electrode 10 for a lithium ion secondary battery in FIG. 1 and has negative electrode active material layers on both sides of a current collector, for example. The negative electrode is preferred to have larger negative charge capacity compared to the electric capacity obtained from a positive electrode active material agent (a charge capacity as a battery). This makes it possible to suppress deposition of lithium metal on a negative electrode.

The positive electrode active material layer is provided on a part of both surfaces of a positive electrode current collector, and the negative electrode active material layers are also provided on a part of both surfaces of a negative electrode current collector. In this case, the negative electrode active material layer provided on the negative electrode current collector, for example, has a region which does not corresponds to a positive electrode active material layer to be faced. This intends to perform a stabilized battery design.

The above region where the negative electrode active material layer and the positive electrode active material layer do not face each other is hardly influenced by charge/discharge. Therefore the state of a negative electrode active material layer is kept intact as just after the formation, thereby the composition of the negative electrode active material and the like can be evaluated accurately with good reproducibility, since the composition and so on does not depend on the existence or nonexistence of charge/discharge.

[Separator]

The separator is a one which separates a positive electrode and a negative electrode, and allows lithium ions to pass with preventing current short due to a contact of both electrodes. This separator is formed by a porous film consists of synthetic resin or ceramic, for example, and may be contain a laminate structure in which two or more porous films are laminated. As the synthetic resin, polytetrafluoroethylene, polypropylene, polyethylene, etc. are illustrated, for example.

[Electrolytic Solution]

A part of the active material layer or the separator is impregnated by liquid electrolyte (electrolytic solution). In this electrolytic solution, electrolyte salt is dissolved in solvent, and other materials such as additive agent may be contained.

As the solvent, for example, nonaqueous solvent may be used. As the nonaqueous solvent, for example, ethylene carbonate, propylene carbonate, butylene carbonate, dimethyl carbonate, diethyl carbonate, ethyl methyl carbonate, methyl propyl carbonate, 1,2-dimethoxyethane, tetrahydrofuran are illustrated. Among them, it is preferred to use one or more of ethylene carbonate, propylene carbonate, dimethyl carbonate, diethyl carbonate, ethyl methyl carbonate, since better property can be obtained.

Moreover, in this case, it is possible to improve dissociation of electrolyte salt and ionic mobility by combining high-viscosity solvent such as ethylene carbonate, propylene carbonate and low-viscosity solvent such as dimethyl carbonate, ethyl methyl carbonate, diethyl carbonate.

When alloy based negative electrode is used, it is especially desirable to contain at least one of halogenated chain carbonate ester or halogenated cyclic carbonate ester, as the solvent.

Thereby it possible to form stable coat on the surface of the negative electrode active material during charge/discharge, especially during charge.

Here, the halogenated chain carbonate ester is chain carbonate ester having halogen as a constitutive element (that is, at least one hydrogen is substituted by halogen). And the halogenated cyclic carbonate ester is cyclic carbonate ester having halogen as a constitutive element (that is, at least one hydrogen is substituted by halogen).

Although the kind of the halogen is not particularly limited, fluorine is preferred, since better coat is formed compared to other halogens. As the number of halogen, the larger is better. Because it is possible to obtain more stable coat and to lower decomposition reaction of the electrolytic solution.

As the halogenated chain carbonate ester, for example, fluoromethyl methyl carbonate, difluoromethyl methyl carbonate, etc. are illustrated. As the halogenated cyclic carbonate ester, for example, 4-fluoro-1,3-dioxolane-2-one, 4,5-difluoro-1,3-dioxolane-2-one are illustrated.

It is preferred to contain cyclic carbonate ester having unsaturated carbon-to-carbon bond as an additive to the solvent. Because it is possible to form a stable coat on the surface of a negative electrode during charge/discharge and to suppress decomposition reaction of electrolytic solution. As the cyclic carbonate ester having unsaturated carbon-to-carbon bond, for example, vinylene carbonate, vinyl ethylene carbonate are illustrated.

Moreover, it is preferred to contain sultone (cyclic sulfonic ester) as an additive to the solvent, since chemical stability of a battery is improved. As the sultone, for example, propane sultone, propene sultone are illustrated.

Furthermore, a solvent preferably contains acid anhydride, since chemical stability of the electrolytic solution is improved. As the acid anhydride, for example, propane disulfonic anhydride is illustrated.

The electrolyte salt may contain any one or more of light metal salt such as lithium salt. As the lithium salt, for example, lithium hexafluorophosphate ($LiPF_6$), lithium tetrafluoroborate ($LiBF_4$) are illustrated.

The content of the electrolyte salt is preferably 0.5 mol/kg or more and 2.5 mol/kg or less to the solvent, since high ion conductivity can be obtained.

[Method for Producing a Laminate Film Type Lithium Ion Secondary Battery]

In the beginning, a positive electrode is prepared by using the positive electrode material described above.

First, the positive electrode active material is mixed with a binder, conductive assistant agent, etc. according to a necessity to make a positive electrode mixture, and subsequently dispersed in organic solvent to make positive electrode mixture slurry.

Subsequently, the mixture slurry is applied to a positive electrode current collector by a coating apparatus such as a die coater having a knife roll or a die head, and then a positive electrode active material layer is obtained by hot-air drying.

Lastly, the positive electrode active material layer is compression molded by a roll-press machine and the like. In this case, heating or plural times of repetition may be applied.

Then, the positive electrode active material layers are formed on both side of the positive electrode current collector. At this time, the coating length of the active material on one side of the positive electrode current collector may be different from that of the active material on the other side of the positive electrode current collector.

Next, a negative electrode active material layer is formed on a negative electrode current collector to prepare a negative electrode by using the same operation procedure as in the negative electrode 10 for a lithium ion secondary battery described above.

When preparing a positive electrode and a negative electrode, each active material layers are formed on each of the positive electrode and the negative electrode. In this case, the coating length of the active material on one side of the electrode current collector may be different from that of the active material on the other side of the electrode current collector in either electrode (see FIG. 1).

Subsequently, an electrolytic solution is prepared. Then the positive lead 32 is attached to the positive electrode current collector and the negative lead 33 is attached to the negative electrode current collector by ultrasonic welding and the like.

Then, the positive electrode and the negative electrode are laminated via a separator or wound to prepare the wound electrode body 31, and a protection tape is adhered onto its periphery. Subsequently, the wound body is formed so as to be flat shape.

Further, the wound electrode body is put between the film-shaped folded outer packaging, and then the insulation parts of the outer packaging 35 are adhered each other by hot melt method, thereby the wound electrode body is encapsulated with one direction is released. An adhesion film is inserted between the positive electrode lead as well as the negative electrode lead and the outer packaging.

The electrolytic solution prepared as above is introduced through the released part in a certain amount, thereby vacuum impregnation is performed. After the impregnation, the released part is adhered by vacuum hot melt method.

A laminate film type secondary battery 30 can be prepared as described above.

EXAMPLES

Hereinafter, with reference to examples and comparative examples, the present invention will be more detailed. However, the present invention is not limited thereto.

Example 1-1 to Example 1-5

Laminate film type secondary batteries 30 shown in FIG. 3 were prepared according to the following procedure.

First, a positive electrode was prepared. As a positive electrode active material, 95% by mass of $LiCoO_2$ of a lithium cobalt composite oxide, 2.5% by mass of a positive electrode conductive assistant agent, and 2.5% by mass of a positive electrode binder (polyvinylidene fluoride: PVDF) are mixed to form a positive electrode mixture. Subsequently, the positive electrode mixture is dispersed inorganic solvent (N-methyl-2-pyrrolidone: NMP) to form paste-state slurry. Then, the slurry was applied onto both side of the positive electrode current collector by a coating apparatus having a die head, and subsequently dried by a hot-air drying apparatus. In this case, a positive electrode current collector with a thickness of 15 μm was used. Lastly, compression molding was performed by a roll-press.

Then, a negative electrode was prepared. As a negative electrode active material, a mixed raw material of metal silicon and silicon dioxide were introduced into a reaction furnace and vaporized in an atmosphere of a vacuum of 10 Pa, and then deposited onto an absorbing plate. After the deposited absorbing plate was sufficiently cooled, the deposit was taken out and ground by a ball mill.

The particle size was adjusted, and then the adjusted particle was covered with carbon layer by thermal decomposition CVD according to a necessity.

The prepared powder was subjected to inner-bulk reforming in a mixed solvent of propylene carbonate and ethylene carbonate (1:1, containing 1.3 mol/Kg of electrolyte salt) by an electrochemical method with using an inner-bulk reforming apparatus 20.

The obtained material was subjected to drying treatment under a carbonic acid atmosphere according to a necessity.

Subsequently, the particle of negative electrode active material, a precursor of a negative electrode binder, a conductive assistant agent 1 and a conductive assistant agent 2 were mixed in a dried-weight ratio of 80:8:10:2, and then diluted by NMP to form paste-state negative electrode mixture slurry. In this case, NMP was used as solvent for polyamic acid.

Then the negative electrode mixture slurry was applied to both sides of a negative electrode current collector by a coating apparatus, followed by drying. As this negative electrode current collector, electrolytic copper foil (thickness=15 μm) was used.

Lastly, it was fired at 400° C. for 1 hour in a vacuum atmosphere. Thereby a negative electrode binder (polyimide) was formed.

Subsequently, solvents (4-fluoro-1,3-dioxolane-2-one (FEC), ethylene carbonate (EC), and dimethyl carbonate (DMC)) are mixed, and then electrolyte salt (lithium hexafluorophosphate: $LiPF_6$) was dissolved to prepare electrolyte. In this case, the composition of the solvent was set to FEC:EC:DMC=10:20:70 in a volume ratio, and the content of the electrolyte salt was set to 1.2 mol/kg for the solvent.

Then a secondary battery was assembled as follows.

First, aluminum lead was welded to one end of the positive electrode current collector by ultrasonic, and nickel lead was welded to one end of the negative electrode current collector.

Subsequently, the positive electrode, a separator, the negative electrode, and a separator were laminated in this order, and wound in a longitudinal direction to obtain a wound electrode body. The end of the winding was fixed with PET protection tape. As the separator, a laminated film (thickness of 12 μm) in which a porous polypropylene-base film was put between porous polyethylene-base films was used.

Then, the electrode body was put between outer packaging, and then peripheries excluding one side are hot melted, and thereby the electrode body was stored in the outer packaging. As the outer packaging, an aluminum laminated film in which a nylon film, aluminum foil, and a polypropylene film are laminated, was used.

Subsequently, the prepared electrolyte was introduced through the openings and impregnated under vacuum atmosphere, and then the outer packaging was hot melted and encapsulated.

In Example 1-1 to Example 1-5, "x" in $SiO_x$ was fixed to 0.9, and $Si/SiO_2$ component generated in the bulk was varied to change the ratio of the intensity A of a peak in a Si-region and the intensity B of a peak in a $SiO_2$-region: A (Si)/B ($SiO_2$). Each A (Si)/B ($SiO_2$) of Example 1-1, Example 1-2, Example 1-3, Example 1-4, and Example 1-5 was 0.8, 1, 1.5, 2, and 3.

Besides, the median diameter of the particle of negative electrode active material was 4 μm, the full width at half maximum (2θ) of a diffraction peak attributable to (111) crystal face obtained by an X-ray diffraction of the negative electrode active material was 1.22°, size of the crystallite corresponding to Si (111) face was 7.21 nm, and the lithium compound contained in the particle of negative electrode active material was amorphous $Li_4SiO_4$.

The cycle characteristics and the initial charge/discharge characteristics of the secondary battery were evaluated on Example 1-1 to Example 1-5.

The cycle characteristics were evaluated as follows.

First, charge/discharge was performed for two cycles at an atmosphere of 25° C. in order to stabilize the battery, and the discharge capacity at the second cycle was measured.

Subsequently, charge/discharge was performed until the total cycle attains to 100 cycles, and the discharge capacities were measured each time.

Lastly, the discharge capacity at 100th cycle was divided by the discharge capacity at second cycle to calculate a capacity retention ratio.

Besides, as the cycle condition, until a voltage reaches 4.2 V, constant current charge was performed at a constant current density of 2.5 mA/cm$^2$, and after reaching the voltage, charge was performed at a constant voltage of 4.2 V until a current density reaches 0.25 mA/cm$^2$. In a discharge, constant current discharge was performed at a constant current density of 2.5 mA/cm$^2$ until the voltage reaches 2.5 V.

As initial charge/discharge characteristic, initial efficiency (%)=(an initial discharge capacity/an initial charge capacity)×100 was calculated.

Besides, the atmosphere and the temperature was set to the same as in the evaluation of the cycle characteristics, and the charge/discharge condition was set to 0.2 times that of the evaluation of the cycle characteristics.

Comparative Example 1-1 to Comparative Example 1-4

Secondary batteries were prepared in a manner similar to that of Example 1-1 to Example 1-5. However, A (Si)/B (SiO$_2$) was also varied in Comparative Example 1-1 to Comparative Example 1-4 as following. Each A (Si)/B (SiO$_2$) of Comparative Example 1-1, Comparative Example 1-2, Comparative Example 1-3, and Comparative Example 1-4 was 0.1, 0.3, 0.5, and 0.65 respectively.

Cycle characteristics and initial charge/discharge characteristics of the secondary battery were also evaluated on Comparative Example 1-1 to Comparative Example 1-4 in a manner similar to that of Example 1-1 to Example 1-5.

In Table 1, measured results of Comparative Example 1-1 to Comparative Example 1-4 and Example 1-1 to Example 1-5 are shown.

TABLE 1

|  | A (Si)/ B (SiO$_2$) | capacity retention ratio [%] | initial efficiency [%] |
|---|---|---|---|
| Comparative Example 1-1 | 0.1 | 60 | 46 |
| Comparative Example 1-2 | 0.3 | 64 | 64 |
| Comparative Example 1-3 | 0.5 | 66 | 66 |
| Comparative Example 1-4 | 0.65 | 70 | 68 |
| Example 1-1 | 0.8 | 80 | 70 |
| Example 1-2 | 1 | 81 | 71 |
| Example 1-3 | 1.5 | 82 | 73.5 |
| Example 1-4 | 2 | 82 | 75 |
| Example 1-5 | 3 | 82 | 75 |

As can be seen from Table 1, as the intensity B of a peak in a SiO$_2$-region in a $^{29}$Si-MAS-NMR spectrum became smaller, both of the battery properties had higher values.

By setting A (Si)/B (SiO$_2$) to 0.8 or more, SiO$_2$ part, which is a reaction site with Li, can be previously lowered, thereby initial battery efficiency is improved and a stabilized Li compound exists in the bulk or on the surface, which makes it possible to suppress the deterioration of the battery due to charge/discharge.

Example 2-1 to Example 2-4

Secondary batteries were prepared in a manner similar to that of Example 1-1 to Example 1-5. However, A (Si)/B (SiO$_2$) was fixed to 2, and an oxygen content in the bulk was varied. In this case, the oxygen content of the deposit was changed by changing a ratio of the starting material to be vaporized or a vaporizing temperature.

Each "x" in SiO$_x$ of Example 2-1, Example 2-2, Example 2-3, and Example 2-4 was 0.5, 0.7, 1.2, and 1.6 respectively.

The cycle characteristics and the initial charge/discharge characteristics of the secondary battery were evaluated on Example 2-1 to Example 2-4 in a manner similar to that of Example 1-1 to Example 1-5.

Comparative Example 2-1 to Comparative Example 2-2

Secondary batteries were prepared in a manner similar to that of Example 1-1 to Example 1-5. However, A (Si)/B (SiO$_2$) was fixed to 2, and an oxygen content in the bulk was varied. In this case, the oxygen content of the deposit was changed by changing a ratio of the starting material to be vaporized or a vaporizing temperature.

Each "x" in SiO$_x$ of Comparative Example 2-1 and Comparative Example 2-2 was 0.3 and 1.8 respectively.

The cycle characteristics and the initial charge/discharge characteristics of the secondary battery were also evaluated on Comparative Example 2-1 to Comparative Example 2-2 in a manner similar to that of Example 1-1 to Example 1-5.

In Table 2, measured results of Comparative Example 2-1 to Comparative Example 2-2 and Example 2-1 to Example 2-4 are shown.

The results of Example 1-4, in which "x" in SiO$_x$ is 0.9, are also shown in Table 2.

TABLE 2

|  | "x" in SiO$_x$ | capacity retention ratio [%] | initial efficiency [%] |
|---|---|---|---|
| Comparative Example 2-1 | 0.3 | 65 | 81 |
| Example 2-1 | 0.5 | 80 | 77 |
| Example 2-2 | 0.7 | 81 | 76 |
| Example 1-4 | 0.9 | 82 | 75 |
| Example 2-3 | 1.2 | 81 | 74 |
| Example 2-4 | 1.6 | 81 | 74 |
| Comparative Example 2-2 | 1.8 | 73 | 70 |

As can be seen from Table 2, when the oxygen was insufficient (x=0.3), the initial efficiency was improved, but the capacity retention ratio was significantly deteriorated. On the other hand, when the oxygen content was high (x=1.8), the conductivity came to lower, and both of the capacity retention ratio and the initial efficiency were lowered.

Example 3-1 to Example 3-12

Secondary batteries were prepared in a manner similar to that of Example 1-1 to Example 1-5. However, A (Si)/B (SiO$_2$) was fixed to 2, "x" in SiO$_x$ was fixed to 0.9, and a state of the generated content (lithium compound) was varied by controlling electric potential, electric current, and a method for insertion/elimination of Li in the preparation of the lithium compound.

Moreover, a state of the content was changed to more stable material by adjusting a gas atmosphere and thermal drying after it was generated.

For example, Li$_4$SiO$_4$ is separated to Li$_2$SiO$_3$ and Li$_2$CO$_3$ by heating under carbon dioxide atmosphere.

By adopting these reaction and so on to realize the optimum bulk state, improvements of a capacity retention ratio and initial efficiency were realized.

The obtained Li compounds can be confirmed by XPS, for example, $Li_4SiO_4$ is given at the binding energy near 532 eV, and $Li_2SiO_3$ is given at the binding energy near 530 eV.

The obtained Li compounds can also be confirmed by $^{29}Si$-MAS-NMR spectrum.

Furthermore, crystallinity of the generated contents were changed. Crystallinity can be controlled by a thermal treatment under a non-atmospheric circumstance after a Li-insertion/elimination.

The cycle characteristics and the initial charge/discharge characteristics of the secondary battery were evaluated on Example 3-1 to Example 3-12 in a manner similar to that of Example 1-1 to Example 1-5.

In Table 3, measured results of Example 3-1 to Example 3-12 are shown.

The results of Example 1-4, in which the generated content is an amorphous $Li_4SiO_4$, are also shown in Table 3.

TABLE 3

| | contents | capacity retention ratio [%] | initial efficiency [%] | full width at half maximum |
|---|---|---|---|---|
| Example 1-4 | $Li_4SiO_4$ | 82 | 75 | amorphous |
| Example 3-1 | $Li_2SiO_3$ | 82 | 75.5 | amorphous |
| Example 3-2 | $Li_2CO_3$ | 82.5 | 75 | amorphous |
| Example 3-3 | $Li_4SiO_4$, $Li_2SiO_3$ | 82.5 | 76 | amorphous |
| Example 3-4 | $Li_4SiO_4$, $Li_2CO_3$ | 83.5 | 76 | amorphous |
| Example 3-5 | $Li_2CO_3$, $Li_2SiO_3$ | 84 | 76 | amorphous |
| Example 3-6 | $Li_4SiO_4$, $Li_2SiO_3$, $Li_2CO_3$ | 84.5 | 76.5 | amorphous |
| Example 3-7 | $Li_4SiO_4$ | 76 | 73 | 0.15° |
| Example 3-8 | $Li_4SiO_4$ | 81 | 74 | 0.2° |
| Example 3-9 | $Li_4SiO_4$ | 81.5 | 74.5 | 1° |
| Example 3-10 | $Li_2SiO_3$ | 75.5 | 72 | 0.4° |
| Example 3-11 | $Li_2SiO_3$ | 80.5 | 73 | 0.75° |
| Example 3-12 | $Li_2SiO_3$ | 81 | 74 | 1° |

As can be seen from Table 3, it is desirable that the generating lithium compound(s) is substantially amorphous. Because high crystallinity increases a resistance of an active material.

As also can be seen from Table 3, it is preferable that a full width at half maximum (2θ), which represents a crystallinity, is 0.2° or more when the content is $Li_4SiO_4$, and it is preferable that a full width at half maximum (2θ) is 0.75° or more when the content is $Li_2SiO_3$.

Besides, in consideration of above results, secondary batteries were prepared using the lithium compounds in amorphous states in the following examples.

Furthermore, as can be seen from Table 3, better initial charge/discharge characteristics are obtained when plural of lithium compounds are generated.

Example 4-1 to Example 4-3

Secondary batteries were prepared in a manner similar to that of Example 1-1 to Example 1-5. However, that A (Si)/B ($SiO_2$) was fixed to 2, "x" in $SiO_x$ was fixed to 0.9, and amorphous $Li_4SiO_4$, $Li_2SiO_3$, and $Li_2CO_3$ were used as the contained lithium compounds. Further, in bulk reforming treatment, the Lithium compounds were generated and a fluorine compound was formed on a surface of an active material by controlling electric potential and electric current as well as holding in a warmed solvent.

In Example 4-1, Example 4-2, and Example 4-3, each generated fluorine compound(s) were LiF, decomposition product of $LiPF_6$, and decomposition product of $LiF+LiPF_6$ respectively.

The cycle characteristics and the initial charge/discharge characteristics of the secondary battery were evaluated on Example 4-1 to Example 4-3 in a manner similar to that of Example 1-1 to Example 1-5.

In Table 4, measured results of Example 4-1 to Example 4-3 are shown.

Example 3-6, in which a fluorine compound is not generated, is also shown in Table 4.

TABLE 4

| | coat | coverage [%] | capacity retention ratio [%] | initial efficiency [%] |
|---|---|---|---|---|
| Example 3-6 | none | — | 84.5 | 76.5 |
| Example 4-1 | LiF | 50 | 84.8 | 77.2 |
| Example 4-2 | decomposition product of $LiPF_6$ | 50 | 84.7 | 77.0 |
| Example 4-3 | decomposition product of $LiF + LiPF_6$ | 50 | 84.7 | 77.3 |

As can be seen from Table 4, especially an initial efficiency was remarkably improved and a long-term storage stability of an active material (i.e., capacity retention ratio) was also improved by forming a coat consists of fluorine compound(s).

Example 5-1 to Example 5-9

Secondary batteries were prepared in a manner similar to that of Example 1-1 to Example 1-5. However, A (Si)/B ($SiO_2$) was fixed to 2, "x" in $SiO_x$ was fixed to 0.9, amorphous $Li_4SiO_4$, $Li_2SiO_3$, and $Li_2CO_3$ were used as contained lithium compounds, and a surface layer of an active material was coated using LiF at a coverage of 50%. Moreover, a crystallinity of an active material was changed.

In Example 5-1, Example 5-2, Example 5-3, Example 5-4, Example 5-5, Example 5-6, Example 5-7, Example 5-8, and Example 5-9, each full width at half maximum (2θ), which represents a crystallinity, was 0.756°, 0.796°, 1.025°, 1.271°, 1.845°, 2.257°, 2.593°, 10.123°, and 20.221° respectively; and each size of crystallite corresponding to Si (111) face were 11.42 nm, 10.84 nm, 8.55 nm, 6.63 nm, 4.62 nm, 3.77 nm, 3.29 nm, 1.524 nm, and 0 nm respectively.

In addition, in Example 5-9, the full width at half maximum was calculated as 20° or more, but this is a result fitted by an analytical software, and a peak was not obtained substantially. Therefore, in Example 5-9, it was substantially amorphous.

The cycle characteristics and the initial charge/discharge characteristics of the secondary battery were evaluated on Example 5-1 to Example 5-9 in a manner similar to that of Example 1-1 to Example 1-5.

In Table 5, measured results of Example 5-1 to Example 5-9 are shown.

TABLE 5

| | full width at half maximum 2θ [°] | Si (111) crystallite [nm] | capacity retention ratio [%] | initial efficiency [%] |
|---|---|---|---|---|
| Example 5-1 | 0.756 | 11.42 | 82.1 | 75.1 |
| Example 5-2 | 0.796 | 10.84 | 82.4 | 75.2 |
| Example 5-3 | 1.025 | 8.55 | 83.1 | 75.0 |
| Example 5-4 | 1.271 | 6.63 | 85.3 | 77.3 |
| Example 5-5 | 1.845 | 4.62 | 85.4 | 77.3 |

TABLE 5-continued

|  | full width at half maximum 2θ [°] | Si (111) crystallite [nm] | capacity retention ratio [%] | initial efficiency [%] |
|---|---|---|---|---|
| Example 5-6 | 2.257 | 3.77 | 85.6 | 77.4 |
| Example 5-7 | 2.593 | 3.29 | 86 | 77.4 |
| Example 5-8 | 10.123 | 1.524 | 86.5 | 77.4 |
| Example 5-9 | 20.221 | 0 | 86.7 | 77.4 |

As can be seen from Table 5, a capacity retention ratio and initial efficiency were changed according to a crystallinity of an active material.

Especially, higher capacity retention ratio and higher initial efficiency were obtained in low-crystallinity materials in which a full width at half maximum was at least 1.2° or size of the crystallite corresponding to Si (111) face is 7.5 nm or less.

Among them, the most favorable characteristics were obtained when the active material was amorphous.

Example 6-1

A secondary battery was prepared in a manner similar to that of Example 1-1 to Example 1-5. However, A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of an active material was coated using LiF at a coverage of 50%. Further, regarding a crystallinity of a negative electrode active material, full width at half maximum (2θ) was 20.221.

Moreover, a peak value of a Si-region in a $^{29}$Si-MAS-NMR spectrum was changed.

Figure 6:
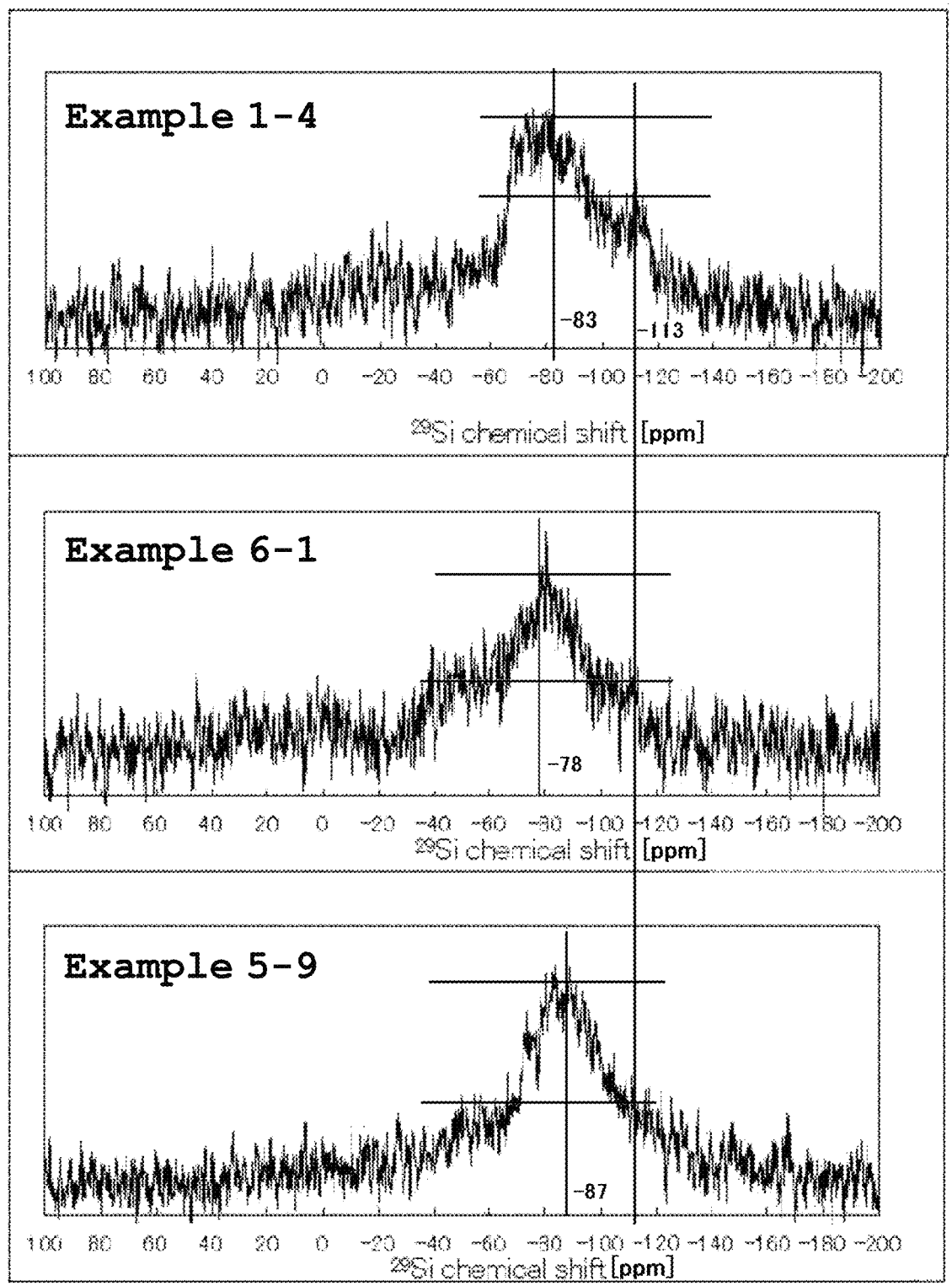
FIG. 6 is a figure of $^{29}$Si-MAS-NMR spectra in examples of the present invention.

In Example 6-1, a peak value of a particle of negative electrode active material was −78 ppm, which is in a range of −70 to −85 ppm (see FIG. 6).

The cycle characteristics and the initial charge/discharge characteristics of the secondary battery were evaluated on Example 6-1 in a manner similar to that of Example 1-1 to Example 1-5.

In Table 6, measured results of Example 6-1 are shown.

Example 5-9, in which a peak value of a Si-region in a $^{29}$Si-MAS-NMR spectrum of the particle of negative electrode active material was −87 as shown in FIG. 6, is also shown in Table 6.

TABLE 6

|  | full width at half maximum 2θ [°] | peak in Si-region [ppm] | capacity retention ratio [%] | initial efficiency [%] |
|---|---|---|---|---|
| Example 5-9 | 20.221 | −87 | 86.7 | 77.4 |
| Example 6-1 | 20.221 | −78 | 88.5 | 77.4 |

As can be seen from Table 6, a capacity retention ratio is improved by shifting a peak value of a Si-region in a $^{29}$Si-MAS-NMR spectrum of the particle of negative electrode active material to within a region of −70 to −85 ppm.

Therefore, it is more desirable for a peak value of Si-region in a $^{29}$Si-MAS-NMR spectrum of the particle of negative electrode active material to be in a region of −70 to −85 ppm.

Usually, a peak in a Si-region in a $^{29}$Si-MAS-NMR spectrum is obtained in a region of −85 ppm or below, but it can be shifted to low magnetic field side such as a region described above by changing a bond angle of Si—O—Si and the like. That is, more stable bulk situation is realized by shifting a bond angle of Si.

Example 7-1 to Example 7-6

Secondary batteries were prepared in a manner similar to that of Example 1-1 to Example 1-5. However, that A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of an active material was coated using LiF at a coverage of 50%. Further, regarding a crystallinity of a negative electrode active material, full width at half maximum (2θ) was 1.271.

Moreover, a median diameter of a particle of negative electrode active material was changed.

In Example 7-1, Example 7-2, Example 7-3, Example 7-4, Example 7-5, and Example 7-6, each median diameter of a particle of negative electrode active material were 0.1 μm, 0.5 μm, 1 μm, 10 μm, 20 μm, and 30 μm respectively.

The cycle characteristics and the initial charge/discharge characteristics of the secondary battery were evaluated on Example 7-1 to Example 7-6 in a manner similar to that of Example 1-1 to Example 1-5.

In Table 7, measured results of Example 7-1 to Example 7-6 are shown.

Example 5-4, in which a median diameter of a particle of negative electrode active material was 4 μm, is also shown in Table

TABLE 7

|  | D$_{50}$ [μm] | capacity retention ratio [%] | initial efficiency [%] |
|---|---|---|---|
| Example 7-1 | 0.1 | 81.6 | 70.5 |
| Example 7-2 | 0.5 | 84.6 | 73.5 |
| Example 7-3 | 1 | 85.3 | 76.8 |
| Example 5-4 | 4 | 85.3 | 77.3 |
| Example 7-4 | 10 | 84.6 | 77.3 |
| Example 7-5 | 20 | 83.1 | 74.2 |
| Example 7-6 | 30 | 80.6 | 71 |

As can be seen from Table 7, a capacity retention ratio and initial efficiency became higher when a median diameter of a particle of negative electrode active material was 0.5 μm to 20 μm.

Example 8-1 to Example 8-7

Secondary batteries were prepared in a manner similar to that of Example 1-1 to Example 1-5. However, A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of a negative electrode active material was coated using LiF at a coverage of 50%. Further, regarding a crystallinity of a negative electrode active material, full width at half maximum (2θ) was 1.271.

Moreover, a carbon layer was formed on a surface layer of a particle of negative electrode active material by using a thermal decomposition CVD method.

In Example 8-1, Example 8-2, Example 8-3, Example 8-4, Example 8-5, Example 8-6, and Example 8-7, each film thickness of a carbon layer was 1 nm, 100 nm, 200 nm, 500 nm, 1000 nm, 5000 nm, and 7500 nm respectively; the coverage in Example 8-1 was 60%, and the coverages in Example 8-2 to Example 8-7 were 80%.

The cycle characteristics and the initial charge/discharge characteristics of the secondary battery were evaluated on Example 8-1 to Example 8-7 in a manner similar to that of Example 1-1 to Example 1-5.

In Table 8, measured results of Example 8-1 to Example 8-7 are shown.

Example 5-4, in which a carbon layer is not formed on a surface layer of a particle of negative electrode active material, is also shown in Table 8.

TABLE 8

| | C layer | C layer thickness [nm] | C layer coverage [%] | capacity retention ratio [%] | initial efficiency [%] |
|---|---|---|---|---|---|
| Example 5-4 | none | — | — | 85.3 | 77.3 |
| Example 8-1 | exist | 1 | 60 | 86.0 | 77.3 |
| Example 8-2 | exist | 100 | 80 | 86.5 | 77.6 |
| Example 8-3 | exist | 200 | 80 | 86.6 | 77.7 |
| Example 8-4 | exist | 500 | 80 | 86.7 | 77.7 |
| Example 8-5 | exist | 1000 | 80 | 86.8 | 77.7 |
| Example 8-6 | exist | 5000 | 80 | 86.8 | 77.6 |
| Example 8-7 | exist | 7500 | 80 | 86.8 | 77.4 |

As can be seen from Table 8, when film thickness of a carbon layer is 1 nm or more, conductivity is improved, thereby battery characteristics (capacity retention ratio and an initial efficiency) can be improved.

However, when film thickness of a carbon layer is thicker than 7000 nm, a battery capacity lead to lower due to a design of a battery. Therefore, 1 nm to 5000 nm is more desirable in consideration of a battery capacity and battery characteristics.

Example 9-1 to Example 9-4

Secondary batteries were prepared in a manner similar to that of Example 1-1 to Example 1-5. Except that A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of a negative electrode active material was coated using LiF at a coverage of 50%. Further, regarding a crystallinity of a negative electrode active material, full width at half maximum (2θ) was 1.271.

Moreover, the film thickness of a carbon layer on a surface layer of a particle of negative electrode active material was set to 100 nm, and a coverage was changed.

In Example 9-1, Example 9-2, Example 9-3, and Example 9-4, each coverage of a carbon layer was 20%, 30%, 50%, and 90% respectively.

The cycle characteristics and the initial charge/discharge characteristics of the secondary battery were evaluated on Example 9-1 to Example 9-4 in a manner similar to that of Example 1-1 to Example 1-5.

Furthermore, a load characteristic was evaluated on Example 8-2, in which coverage of a carbon layer were 80%, and Example 9-1 to Example 9-4.

Here, the load characteristic is a value which is obtained by dividing discharge capacity when discharge was performed at a discharge current per unit area of a negative electrode of 2 mA/cm$^2$ by a capacity when discharge was performed at a discharge current per unit area of a negative electrode of 0.25 mA/cm$^2$.

In Table 9, measured results of Example 8-2 and Example 9-1 to Example 9-4 are shown.

TABLE 9

| | C layer coverage [%] | load characteristic [%] | capacity retention ratio [%] | initial efficiency [%] |
|---|---|---|---|---|
| Example 9-1 | 20 | 85 | 86.0 | 77.3 |
| Example 9-2 | 30 | 90 | 86.5 | 77.6 |
| Example 9-3 | 50 | 93 | 86.6 | 77.7 |
| Example 8-2 | 80 | 96 | 86.5 | 77.6 |
| Example 9-4 | 90 | 97 | 86.7 | 77.7 |

As can be seen from Table 9, when a coverage of a carbon layer was increased, especially battery load characteristic was improved. Particularly, a retention ratio obtained by the load characteristic exceeded 90% when the coverage was 30% or more, and therefore it is desirable that the coverage of a carbon layer is 30% or more.

Example 10-1 to Example 10-3

Secondary batteries were prepared in a manner similar to that of Example 1-1 to Example 1-5. However, A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of a negative electrode active material was covered with LiF. Further, regarding a crystallinity of a negative electrode active material, full width at half maximum (2θ) was 1.271.

Moreover, the film thickness of a carbon layer on a surface layer of a particle of negative electrode active material was set to 100 nm, the coverage was set to 80%, and a coverage of a LiF layer coating a surface layer of negative electrode active material was changed.

In Example 10-1, Example 10-2, and Example 10-3, each coverage of a LiF layer was 20%, 30%, and 70% respectively.

The coverage of a fluorine compound on a surface layer was calculated by a TEM-EDX mapping photograph shown in FIG. 4. The method for calculating a coverage is explained below.

First, on a surface of copper foil, adhesive was applied, and then a powder sample (a particle of negative electrode active material) was sprinkled onto the adhesive.

Subsequently, platinum was deposited onto the surface of the powder sample by a vacuum deposition method.

Then, tungsten was deposited onto the surface of the surface of the platinum by a Focused Ion Beam (FIB) method, and it was further subjected to thin film processing by accelerating voltage=30 kV.

Lastly, the cross-section of a particle of negative electrode active material was observed by High Angle Annular Dark Fields Scanning TEM (accelerating voltage=200 kV).

The state of a fluorine compound covering the surface of a particle was grasped by analyzing EDX while confirming a particle by picture observation.

The coverage of a fluorine compound can be calculated by the ratio of the circumference of a particle and the length of a fluorine compound covering the particle in a manner similar to the coverage of a carbon layer.

The cycle characteristics and the initial charge/discharge characteristics of the secondary battery were evaluated on Example 10-1 to Example 10-3 in a manner similar to that of Example 1-1 to Example 1-5.

In Table 10, measured results of Example 10-1 to Example 10-3 are shown.

Example 8-2, in which a coverage of a LiF layer is 50%, is also shown in Table 10.

TABLE 10

|  | LiF layer coverage [%] | capacity retention ratio [%] | initial efficiency [%] |
| --- | --- | --- | --- |
| Example 10-1 | 20 | 85.8 | 77.1 |
| Example 10-2 | 30 | 86.4 | 77.5 |
| Example 8-2 | 50 | 86.5 | 77.6 |
| Example 10-3 | 70 | 86.5 | 77.9 |

As can be seen from Table 10, when the coverage of a fluorine compound layer was improved, a capacity retention ratio and initial efficiency were improved. When the coverage is 30% or more, better capacity retention ratio and better initial efficiency were obtained.

Example 11-1 to Example 11-3

Secondary batteries were prepared in a manner similar to that of Example 1-1 to Example 1-5. However, A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of a negative electrode active material was covered with LiF at a coverage of 50%. Further, regarding a crystallinity of a negative electrode active material, full width at half maximum (2θ) was 1.271.

Moreover, the film thickness of a carbon layer on a surface layer of a particle of negative electrode active material was set to 100 nm, the coverage was set to 80%.

Furthermore, C (carbon) and S (sulfur) were contained in a negative electrode current collector, and the contents thereof were changed.

In Example 11-1, Example 11-2, and Example 11-3, each contents of C and S in a negative electrode current collector was 200 ppm, 100 ppm and 50 ppm respectively.

It was evaluated whether a negative electrode had deformed or not during charge on Example 11-1 to Example 11-3, together with Example 8-2, in which C and S is not contained in the negative electrode current collector.

In Table 11, evaluated results of Example 11-1 to Example 11-3 and Example 8-2 are shown.

TABLE 11

|  | C, S content in negative electrode current collector Cu [ppm] | deformation of electrode |
| --- | --- | --- |
| Example 8-2 | — | deformed |
| Example 11-1 | 200 | deformed |
| Example 11-2 | 100 | none |
| Example 11-3 | 50 | none |

As can be seen from Table 11, it was possible to suppress a deformation of a negative electrode during charge when a negative electrode current collector contains carbon and sulfur at an amount of 100 ppm or less.

Example 12-1 to Example 12-7

Secondary batteries were prepared in a manner similar to that of Example 1-1 to Example 1-5. However, A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of a negative electrode active material was coated with LiF at a coverage of 50%. Further, regarding a crystallinity of a negative electrode active material, full width at half maximum (2θ) was 1.271.

Moreover, the film thickness of a carbon layer on a surface layer of a particle of negative electrode active material was set to 100 nm, the coverage thereof was set to 80%.

Furthermore, as a negative electrode binder, various materials were used.

In Example 12-1, Example 12-2, Example 12-3, Example 12-4, Example 12-5, Example 12-6, and Example 12-7, each negative electrode binder was polyvinylidene fluoride, aramid, polyacrylic acid, lithium polyacrylate, carbonized polyimide, polyethylene, polymaleic acid respectively.

The cycle characteristics and the initial charge/discharge characteristics of the secondary battery were evaluated on Example 12-1 to Example 12-7 in a manner similar to that of Example 1-1 to Example 1-5.

In Table 12, measured results of Example 12-1 to Example 12-7 are shown.

Example 8-2, in which the negative electrode binder is polyimide, is also shown in Table 12.

TABLE 12

|  | negative electrode binder | capacity retention ratio [%] | initial efficiency [%] |
| --- | --- | --- | --- |
| Example 8-2 | Polyimide | 86.5 | 77.6 |
| Example 12-1 | polyvinylidene fluoride | 85.6 | 78.2 |
| Example 12-2 | Aramid | 86.5 | 78.0 |
| Example 12-3 | polyacrylic acid | 86.5 | 78.2 |
| Example 12-4 | lithium polyacrylate | 86.6 | 78.3 |
| Example 12-5 | carbonized polyimide | 86.6 | 78.0 |
| Example 12-6 | Polyethylene | 85.6 | 78.0 |
| Example 12-7 | polymaleic acid | 85.5 | 78.0 |

As can be seen from Table 12, an excellent capacity retention ratio and excellent initial efficiency were obtained by any negative electrode binder described in the table as a result of evaluation with materials described in the table as a negative electrode binder.

Example 13-1 to Example 13-5

Secondary batteries were prepared in a manner similar to that of Example 1-1 to Example 1-5. However, A (Si)/B (SiO$_2$) was fixed to 2, "x" in SiO$_x$ was fixed to 0.9, amorphous Li$_4$SiO$_4$, Li$_2$SiO$_3$, and Li$_2$CO$_3$ were used as contained lithium compounds, and a surface layer of a negative electrode active material was coated with LiF at a coverage of 50%. Further, regarding a crystallinity of a negative electrode active material, full width at half maximum (2θ) was 1.271.

Moreover, the film thickness of a carbon layer on a surface layer of a particle of negative electrode active material was set to 100 nm, the coverage was set to 80%.

Furthermore, as a method for inner-bulk reforming of a silicon-based material, various methods were used.

In Example 13-1, Example 13-2, Example 13-3, Example 13-4, and Example 13-5, each reforming method was a short method, a method of electric potential and electric current control+Li-insertion, a thermal dope method, a vacuum deposition method, a method of repeating electric potential and electric current control+Li-insertion/subsequent partial elimination for three times respectively.

Here, the method of electric potential and electric current control+Li-insertion is a method to insert Li into a bulk by controlling electric potential and electric current supplied to Li source 21 using an inner-bulk reforming apparatus 20 shown in FIG. 5.

The method of electric potential and electric current control+Li-insertion/subsequent partial elimination is a method to insert Li into a bulk by controlling electric potential and electric current supplied to Li source 21, and then to eliminate a part of the inserted Li by controlling electric potential and electric current using an inner-bulk reforming apparatus 20 shown in FIG. 5.

The short method is a method to insert Li using an electric potential difference generated between the Li source 21 and the powder storage container 25 by electrically shorting between the Li source 21 and the powder storage container 25, without controlling electric potential or electric current.

The thermal dope method is a method to perform a thermal treatment subsequent to mixing a silicon material and a Li metal or a Li compound.

The vapor deposition method is a method in which Li metal, lithium carbonate or the like is heated to vaporize using a resist heating method in a vacuum chamber decompressed at $10^{-2}$ Pa or below, and then this vapor is sprayed onto a silicon-based material powder.

The cycle characteristics and the initial charge/discharge characteristics of the secondary battery were evaluated on Example 13-1 to Example 13-5 in a manner similar to that of Example 1-1 to Example 1-5.

In Table 13, measured results of Example 13-1 to Example 13-5 are shown.

Example 8-2, in which the reforming method is a method of electric potential and electric current control+Li-insertion/subsequent partial elimination, is also shown in Table 13.

TABLE 13

| | reforming method | capacity retention ratio [%] | initial efficiency [%] |
|---|---|---|---|
| Example 8-2 | method of electric potential and electric current control + Li-insertion/subsequent partial elimination | 86.5 | 77.6 |
| Example 13-1 | short method | 78.5 | 73.0 |
| Example 13-2 | method of electric potential and electric current control + Li-insertion | 83.0 | 75.0 |
| Example 13-3 | thermal dope method | 75.0 | 74.0 |
| Example 13-4 | vacuum deposition method | 80.0 | 74.0 |
| Example 13-5 | method of electric potential and electric current control + Li-insertion/subsequent partial elimination, 3 times | 87.0 | 78.0 |

As can be seen from Table 13, the method of electric potential and electric current control+Li-insertion/subsequent partial elimination is desirable as a method for inner-bulk reforming. Further, it is more desirable to perform insertion/elimination for plural times.

On the other hand, it was found that the thermal dope method was not a method which can reform an active material to be more favorable.

Further, it was revealed that the vacuum deposition method is inferior to the method of electric potential and electric current control+Li-insertion/subsequent partial elimination, since more homogeneous reform cannot be achieved.

Example 14-1 to Example 14-7

Secondary batteries were prepared in a manner similar to that of Example 1-1 to Example 1-5. Except that A (Si)/B (SiO$_2$) was fixed to 2, "x" in SiO was fixed to 0.9, amorphous Li$_4$SiO$_4$, Li$_2$SiO$_3$, and Li$_2$CO$_3$ were used as contained lithium compounds, and a surface layer of a negative electrode active material was coated with LiF at a coverage of 50%. Further, regarding a crystallinity of a negative electrode active material, full width at half maximum (2θ) was 1.271.

Furthermore, as a form during inner-bulk reforming of a silicon-based material, various forms were used.

In Example 14-1 and Example 14-3 to Example 14-7, the method of electric potential and electric current control+Li-insertion/subsequent partial elimination was used as a reforming method; on the other hand, in Example 14-2, the vapor deposition method was used as a reforming method.

Moreover, in Example 14-1 and Example 14-2, an inner-bulk reforming was performed in a state that a SiO film was directly formed on copper foil by vapor deposition as a reforming form; in Example 14-3, an inner-bulk reforming was performed in a state that a SiO film was directly formed on copper foil by thermal decomposition CVD (i.e. the method of forming a film in which siloxane and argon gas are introduced into a vacuum chamber, and then heated to 650° C. or more, thereby these gases are thermally decomposed and deposited onto a substrate) as a reforming form.

Furthermore, in Example 14-4, the inner-bulk reforming was performed after an application of a unreformed silicon material onto an electrode; in Example 14-5 to Example 14-7, the inner-bulk reforming was performed after a mixed application of a carbon material and a unreformed silicon material onto an electrode.

In Example 14-5, the mixed application was performed in a ratio of 50% by mass of silicon material and 50% by mass of carbon material; in Example 14-6, the mixed application was performed in a ratio of 30% by mass of silicon material and 70% by mass of carbon material; in Example 14-7, the mixed application was performed in a ratio of 15% by mass of silicon material and 85% by mass of carbon material.

The cycle characteristics and the initial charge/discharge characteristics of the secondary battery were evaluated on Example 14-1 to Example 14-7 in a manner similar to that of Example 1-1 to Example 1-5.

In Table 14, measured results of Example 14-1 to Example 14-7 are shown.

Example 8-2, in which the reforming method is a method of electric potential and electric current control+Li-insertion/subsequent partial elimination and inner-bulk reforming was performed in a powder state as a reforming form, is also shown in Table 14.

TABLE 14

| | reforming method | reforming form | capacity retention ratio [%] | initial efficiency [%] |
|---|---|---|---|---|
| Example 8-2 | method of electric potential and electric current control + Li-insertion/subsequent partial elimination | powder state | 86.5 | 77.6 |
| Example 14-1 | method of electric potential and electric current control + Li-insertion/subsequent partial elimination | vapor deposit SiO | 88.0 | 80.0 |

TABLE 14-continued

| | reforming method | reforming form | capacity retention ratio [%] | initial efficiency [%] |
|---|---|---|---|---|
| Example 14-2 | vacuum deposition method | vapor deposit SiO | 85.0 | 78.0 |
| Example 14-3 | method of electric potential and electric current control + Li-insertion/subsequent partial elimination | CVD-SiO | 86.0 | 79.0 |
| Example 14-4 | method of electric potential and electric current control + Li-insertion/subsequent partial elimination | application of $SiO_x$ | 87.5 | 84.0 |
| Example 14-5 | method of electric potential and electric current control + Li-insertion/subsequent partial elimination | application of $SiO_x$ 50 wt % + C 50 wt % | 89.0 | 85.0 |
| Example 14-6 | method of electric potential and electric current control + Li-insertion/subsequent partial elimination | application of $SiO_x$ 70 wt % + C 30 wt % | 91.0 | 85.0 |
| Example 14-7 | method of electric potential and electric current control + Li-insertion/subsequent partial elimination | application of $SiO_x$ 15 wt % + C 85 wt % | 93.0 | 86.0 |

As can be seen from Table 14, a capacity retention ratio and initial efficiency are improved by forming a SiO film directly onto cupper foil through vapor deposition and reforming through an electrochemical method; initial efficiency are improved by forming a SiO film directly onto cupper foil through thermal decomposition CVD and reforming through an electrochemical method.

A capacity retention ratio and an initial efficiency are also improved by applying a unreformed silicon material onto an electrode, and then reforming through an electrochemical method.

Especially, by a mixed application of a carbon material and a non-reformed silicon material onto an electrode and reform through an electrochemical method, it is possible to reform the silicon material selectively and to improve a battery energy density by a silicon material while making use of an original characteristic of a carbon material; as the ratio of a carbon material increased, a capacity retention ratio and initial efficiency were improved.

Silicon material reacts with Li at a higher relative Li electric potential compared to carbon material, and therefore it is possible to insert Li to a silicon material selectively by controlling an electric potential so as to be the electric potential at which Li is easy to insert to a silicon material. Accordingly, a reform using an electric potential control is effective.

Example 15-1 to Example 15-7

Secondary batteries were prepared in a manner similar to that of Example 1-1 to Example 1-5. However, A (Si)/B ($SiO_2$) was fixed to 2, "x" in SiO was fixed to 0.9, amorphous $Li_4SiO_4$, $Li_2SiO_3$, and $Li_2CO_3$ were used as contained lithium compounds, and a surface layer of a negative electrode active material was coated with LiF at a coverage of 50%. Further, regarding a crystallinity of a negative electrode active material, full width at half maximum (2θ) was 1.271.

Moreover, the film thickness of a carbon layer on a surface layer of a particle of negative electrode active material was set to 100 nm, the coverage was set to 80%.

Furthermore, as a method for inner-bulk reforming of a silicon-based material, the method of electric potential and electric current control+Li-insertion/subsequent partial elimination was used, and powder application was used as a reforming form.

Further, as a reforming source (a Li source), various materials were used.

In Example 15-1, Example 15-2, Example 15-3, Example 15-4, Example 15-5, Example 15-6, and Example 15-7, lithium metal, lithium chloride, lithium carbonate, lithium oxide, olivine iron lithium, Ni containing Li composite oxide, Mn containing Li composite oxide were used respectively as a reforming source.

The cycle characteristics and the initial charge/discharge characteristics of the secondary battery were evaluated on Example 15-1 to Example 15-7 in a manner similar to that of Example 1-1 to Example 1-5.

In Table 15, measured results of Example 15-1 to Example 15-7 are shown.

Example 8-2, in which lithium cobalt oxide was used as a reforming source, is also shown in Table 15.

TABLE 15

| | reforming source (Li source) | capacity retention ratio [%] | initial efficiency [%] |
|---|---|---|---|
| Example 8-2 | lithium cobalt oxide | 86.5 | 77.6 |
| Example 15-1 | Li metal | 86.2 | 78.0 |
| Example 15-2 | lithium chloride | 85.8 | 77.7 |
| Example 15-3 | lithium carbonate | 86.0 | 77.6 |
| Example 15-4 | lithium oxide | 85.9 | 77.5 |
| Example 15-5 | olivine iron lithium | 86.0 | 78.0 |
| Example 15-6 | Ni containing Li composite oxide | 86.0 | 77.9 |
| Example 15-7 | Mn containing Li composite oxide | 85.5 | 77.8 |

As can be seen from Table 15, an excellent capacity retention ratio and excellent initial efficiency were obtained in any reforming source described in the table.

Therefore, it is not necessary to limit a reforming source, but more stable material is desirable considering a producing process.

Lithium composite oxide is more desirable than lithium metal, and lithium cobalt oxide and olivine iron lithium are desirable for example.

Among them, olivine iron lithium is particularly desirable since lower cost is attainable industrially due to its low charge electric potential and an output characteristic is excellent.

Lithium composite oxide also has an advantage to be able to recycle by mixing with a lithium-containing composite material and subjecting to thermal treatment after it was repeated an insertion-elimination of lithium in a predetermined times or more.

In addition, lithium composite oxide is substantially similar to positive electrode material which is considerably deteriorated compared to a battery grade. However, when using as a reforming source, it is allowed that the battery characteristic thereof is low.

It is to be noted that the present invention is not restricted to the foregoing embodiment. The foregoing embodiment is just an illustrative example, and any example that has substantially the same configuration and exerts the same functions and effects as the technical concept described in claims of the present invention is included in the technical scope of the present invention.

The invention claimed is:

1. A negative electrode active material in a state before being incorporated into a slurry for producing a negative electrode, the negative electrode active material comprising:
   a particle of negative electrode active material containing (i) silicon-based material consisting of $SiO_x$ ($0.5 \le x \le 1.6$) and (ii) any one or more of $Li_2SiO_3$, $Li_4SiO_4$, $Li_2O$ and $Li_2CO_3$;
   wherein the intensity A of a peak in a Si-region given in the chemical shift region of from $-50$ to $-95$ ppm and the intensity B of a peak in a $SiO_2$-region given in the chemical shift region of from $-96$ to $-150$ ppm in a $^{29}$Si-MAS-NMR spectrum of the silicon-based material satisfy a relationship that $A/B \ge 0.8$.

2. The negative electrode active material according to claim 1,
   wherein the particle of negative electrode active material has at least one peak corresponding to any one or more of $Li_2SiO_3$ and $Li_4SiO_4$ in a region given in the chemical shift region of from $-50$ to $-95$ ppm in a $^{29}$Si-MAS-NMR spectrum; and
   the particle of negative electrode active material has a peak corresponding to metal Si in a region given in the chemical shift region of from $-50$ to $-95$ ppm in a $^{29}$Si-MAS-NMR spectrum.

3. The negative electrode active material according to claim 2, wherein the particle of negative electrode active material has a peak given in the chemical shift region of from $-70$ to $-85$ ppm in a $^{29}$Si-MAS-NMR spectrum.

4. The negative electrode active material according to claim 2, wherein the particle of negative electrode active material has at least two peaks given in the chemical shift region of from $-50$ to $-95$ ppm in a $^{29}$Si-MAS-NMR spectrum.

5. The negative electrode active material according to claim 1, wherein the particle of negative electrode active material contains any two or more of $Li_2SiO_3$, $Li_4SiO_4$, $Li_2O$, and $Li_2CO_3$.

6. The negative electrode active material according to claim 1, wherein the $Li_2SiO_3$ has a diffraction peak near $38.2680°$ in which the full width at half maximum ($2\theta$) is $0.75°$ or more in an X-ray diffraction.

7. The negative electrode active material according to claim 1, wherein the $Li_4SiO_4$ has a diffraction peak near $23.9661°$ in which the full width at half maximum ($2\theta$) is $0.2°$ or more in an X-ray diffraction.

8. The negative electrode active material according to claim 1, wherein the $Li_2SiO_3$ and the $Li_4SiO_4$ are amorphous.

9. The negative electrode active material according to claim 1, wherein the negative electrode active material has a diffraction peak attributable to Si (111) crystal face in which the full width at half maximum ($2\theta$) is $1.2°$ or more in an X-ray diffraction, and the size of the crystallite corresponding to the crystal face is 7.5 nm or less.

10. The negative electrode active material according to claim 1, wherein the particle of negative electrode active material has a median diameter of 0.5 μm or more and 20 μm or less.

11. The negative electrode active material according to claim 1, wherein the particle of negative electrode active material has carbon material on its surface.

12. The negative electrode active material according to claim 11, wherein the average thickness of the coating carbon material is 1 nm or more and 5000 nm or less.

13. A raw material for a negative electrode active material comprising the negative electrode active material according to claim 1; and a carbon material.

14. A negative electrode comprising:
    a negative electrode active material layer formed by the raw material for a negative electrode active material according to claim 13; and
    a negative electrode current collector,
    wherein
    the negative electrode active material layer is formed on the negative electrode current collector; and
    the negative electrode current collector contains carbon and sulfur, and each content is 100 ppm or less.

15. A lithium ion secondary battery, wherein the lithium ion secondary battery uses a negative electrode containing the negative electrode active material according to claim 1.

16. A method for producing a negative electrode active material, prior to producing a slurry for producing a negative electrode comprising the negative electrode active material, the method comprising:
    doping a particle of negative electrode active material, which contains a silicon-based material consisting of $SiO_x$ ($0.5 \le x \le 1.6$), with any one or more of $Li_2SiO_3$, $Li_4SiO_4$, $Li_2O$ and $Li_2CO_3$,
    wherein the intensity A of a peak in a Si-region given in the chemical shift region of from $-50$ to $-95$ ppm and the intensity B of a peak in a $SiO_2$-region given in the chemical shift region of from $-96$ to $-150$ ppm in a $^{29}$Si-MAS-NMR spectrum satisfy a relationship that $A/B \ge 0.8$.

17. A method for producing a lithium ion secondary battery, comprising:
    preparing a negative electrode by using a negative electrode active material made by the method for producing a negative electrode active material according to claim 16; and
    producing a lithium ion secondary battery by using the prepared negative electrode.

18. The method for producing a negative electrode active material according to claim 16, wherein the particle of negative electrode active material has at least one peak corresponding to any one or more of $Li_2SiO_3$ and $Li_4SiO_4$ in a region given in the chemical shift region of from $-50$ to $-95$ ppm in a $^{29}$Si-MAS-NMR spectrum.

19. The method for producing a negative electrode active material according to claim 16, wherein the particle of negative electrode active material has a peak corresponding to metal Si in a region given in the chemical shift region of from $-50$ to $-95$ ppm in a $^{29}$Si-MAS-NMR spectrum.

20. The method for producing a negative electrode active material according to claim 16, wherein the doping is performed using an inner-bulk reforming apparatus.

* * * * *